United States Patent [19]
Hachiya et al.

[11] Patent Number: 6,107,440
[45] Date of Patent: Aug. 22, 2000

[54] AROMATIC POLYCARBONATE COMPOSITION

[75] Inventors: Hiroshi Hachiya; Kyosuke Komiya, both of Kurashiki, Japan

[73] Assignee: Asahi Kasei Kabushiki Kaisha, Osaka, Japan

[21] Appl. No.: 09/000,229

[22] PCT Filed: Sep. 1, 1996

[86] PCT No.: PCT/JP97/03046

§ 371 Date: Jan. 28, 1998

§ 102(e) Date: Jan. 23, 1998

[87] PCT Pub. No.: WO98/10019

PCT Pub. Date: Mar. 12, 1998

[30] Foreign Application Priority Data

Sep. 2, 1996 [JP] Japan ................................ 8-248509

[51] Int. Cl.$^7$ .................................................. C08G 64/00
[52] U.S. Cl. ............................................ 528/196; 528/198
[58] Field of Search ..................................... 528/196, 198

[56] References Cited

FOREIGN PATENT DOCUMENTS

| | | |
|---|---|---|
| 53-5718 | 3/1978 | Japan . |
| 21-53923 | 6/1990 | Japan . |
| 52-39331 | 9/1993 | Japan . |

*Primary Examiner*—Terressa M. Boykin
*Attorney, Agent, or Firm*—Birch, Stewart, Kolasch & Birch, LLP

[57] ABSTRACT

Disclosed is an aromatic polycarbonate composition which is substantially the same as that produced by a method comprising:

(1) subjecting to a transesterification reaction in a polymerizer at least one polymerizable material selected from a molten monomer mixture of an aromatic dihydroxy compound and a diaryl carbonate, and a molten prepolymer obtained by reacting an aromatic dihydroxy compound with a diaryl carbonate, wherein the polymerizable material is present in the form of a liquid mass in the polymerizer, and wherein the reaction of the liquid mass of polymerizable material is performed under conditions such that the following formula is satisfied: $\log(S/V) \geq 2 \times 10^{-5} \times \bar{M}n + 0.8$, wherein S represents an evaporation surface area (m$^2$) defined as the area (m$^2$) of an exposed surface of the liquid mass of polymerizable material; V represents the volume (m$^3$) of the liquid mass of polymerizable material in the polymerizer; and $\bar{M}n$ represents the $\bar{M}n$ of the aromatic polycarbonate to be produced, thereby obtaining an aromatic polycarbonate (A) in molten form;

(2) adding to (A) in molten form a thermoplastic resin (B) other than an aromatic polycarbonate; and (3) kneading (A) and (B) together.

14 Claims, 7 Drawing Sheets

AROMATIC POLYCARBONATE COMPOSITION

This application claims the benefit under 35 U.S.C. §371 of prior PCT International Application No. PCT/JP97/03046, which has an International filing date of Sep. 1, 1997, which designated the United States of America, the entire contents of which are hereby incorporated by references.

BACKGROUND OF THE INVENTION

1. Field of The Invention

The present invention relates to an aromatic polycarbonate composition. More particularly, the present invention is concerned with an aromatic polycarbonate composition which is substantially the same as that produced by a method comprising: (1) subjecting to a transesterification reaction in a polymerizer at least one polymerizable material selected from the group consisting of a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer, and wherein the transesterification reaction of the liquid mass of polymerizable material is performed under reaction conditions such that a specific relationship is satisfied among an evaporation surface area ($m^2$) of the liquid mass of polymerizable material which is defined as the area ($m^2$) of an exposed surface of the liquid mass of polymerizable material, the volume V ($m^3$) of the liquid mass of polymerizable material in the polymerizer, and the number average molecular weight $\overline{M}n$ of the aromatic polycarbonate to be produced, thereby obtaining an aromatic polycarbonate (A) in molten form; (2) adding to the obtained aromatic polycarbonate (A) in molten form a thermoplastic resin (B) other than an aromatic polycarbonate; and (3) kneading said aromatic polycarbonate (A) and said thermoplastic resin (B) together. The aromatic polycarbonate composition of the present invention is advantageous not only in that it can be produced in high efficiency, but also in that it is a high quality aromatic polycarbonate composition which has excellent color and which is free from occurrence of disadvantageous phenomena during the molding thereof, such as occurrence of silver streaks and a lowering of the Izod impact strength.

2. Prior Art

Aromatic polycarbonates have been known as engineering plastics having excellent heat resistance, impact resistance and transparency, and have been widely used in various fields. Particularly, in recent years, in a wide variety of fields, such as domestic electric appliances and automobiles, use has been made of various shaped articles obtained by molding an aromatic polycarbonate alloy which is produced by kneading an aromatic polycarbonate together with a resin other than an aromatic polycarbonate so as to improve the moldability and/or solvent resistance of the aromatic polycarbonate.

Conventionally, with respect to a shaped polymer alloy article produced from an aromatic polycarbonate and a resin other than an aromatic polycarbonate, the production thereof is conducted by molding a polymer alloy obtained by kneading in an extruder an aromatic polycarbonate, which is obtained by an interfacial polycondensation process using phosgene, together with a resin other than an aromatic polycarbonate. However, such a conventional shaped polymer alloy article has disadvantages as follows. The above-mentioned interfacial polycondensation process has problems in that it is necessary to use phosgene, which is poisonous, and that a reaction apparatus is likely to be corroded with chlorine-containing compounds, such as hydrogen chloride and sodium chloride, which are by-produced, and methylene chloride which is used as a solvent in a large quantity. Further, in the interfacial polycondensation process, it is difficult to separate and remove impurities, such as sodium chloride, and residual methylene chloride. When an aromatic polycarbonate containing the above-mentioned impurities and/or the above-mentioned residual methylene chloride is used to obtain a shaped polymer alloy article, the obtained article disadvantageously has poor thermal stability. Further, conventionally, in the production of the aromatic polycarbonate alloy which is conducted by melt-kneading the aromatic polycarbonate with a resin other than an aromatic polycarbonate, the aromatic polycarbonate is used in the form of pellets or powder, so that melt-kneading needs to be conducted at high temperature so as to melt the aromatic polycarbonate and the resin. As a result, problems arise such that the aromatic polycarbonate suffers heat deterioration, and that the aromatic polycarbonate alloy suffers discoloration. Further, when the aromatic polycarbonate alloy is subjected to molding to obtain a shaped article, the aromatic polycarbonate alloy undergoes heat deterioration during the molding, so that problems arise such that the obtained shaped article disadvantageously has low Izod impact strength and that the shaped article has poor appearance due to the occurrence of silver streaks.

For solving the above-mentioned problems inevitably occurring in association with the production of an aromatic polycarbonate by the interfacial polycondensation process, it has been proposed to conduct the production of an aromatic polycarbonate by melt polymerization process.

In the melt polymerization process, the aromatic polycarbonate is produced by a transesterification process, i.e., performing an ester exchange reaction between an aromatic dihydroxy (e.g., bisphenol A) and a diaryl carbonate (e.g., diphenyl carbonate) in molten state, while removing by-produced phenol. Unlike the interfacial polycondensation process, the transesterification process has an advantage in that a solvent need not be used. However, the transesterification process has a serious problem; namely, since the viscosity of the polymer being formed increases during the progress of the polymerization reaction, it becomes difficult to remove by-produced phenol from the polymerization reaction system efficiently, thus making it difficult to achieve a high degree of polymerization with respect to a polycarbonate produced. Therefore, conventionally, it has been practiced to employ a high polymerization temperature so as to lower the viscosity of the polymer being formed, thereby achieving a high degree of polymerization. In this case, however, the obtained aromatic polycarbonate has disadvantages such that the aromatic polycarbonate is discolored, that the aromatic polycarbonate has a broad molecular weight distribution so that it has poor impact resistance, and that even when the aromatic polycarbonate is mixed with a resin other than an aroma tic polycarbonate and subjected to molding, the resultant shaped article is not free from the problems, such as the discoloration, the lowering of Izod impact strength and the occurrence of silver streaks.

Various polymerizers have been known for use in producing aromatic polycarbonates by the transesterification process. A vertical agitation type polymerizer vessel equipped with an agitator is widely used. The vertical agitation type polymerizer vessel equipped with an agitator is advantageous in that it exhibits high volumetric efficiency and has a simple construction, so that polymerization on a small scale can be efficiently carried out. However, the vertical agitation type polymerizer vessel has a problem in that, as mentioned above, the by-produced phenol is difficult to remove from the polymerization reaction system efficiently in the production of aromatic polycarbonates on a commercial scale, so that the polymerization rate becomes extremely low.

Specifically, a large-scale vertical agitation type polymerizer vessel generally has a greater ratio of liquid volume to vaporization area than a small-scale one. In other words, the depth of a reaction mixture in the polymerizer is large and, hence, the pressure in the lower part of the agitation vessel is large. In such a case, even if the degree of vacuum of the polymerization reaction zone is raised in order to achieve a high degree of polymerization in the lower part of the agitation vessel, the polymerization proceeds under virtually high pressure due to the weight of the reaction mixture, so that phenol and the like cannot be efficiently removed.

To solve the above-mentioned problem, various attempts have been made to remove the by-produced phenol and the like from a high viscosity polymer being formed. For example, Examined Japanese Patent Application Publication No. 50-19600 (corresponding to GB-1007302) discloses the use of a screw type polymerizer having a vent. Examined Japanese Patent Application Publication No. 52-36159 discloses the use of an intermeshing twin-screw extruder. Examined Japanese Patent Application Publication No. 53-5718 (corresponding to U.S. Pat. No. 3,888,826) describes a thin film evaporation type reactor, such as a screw evaporator and a centrifugal film evaporator. Further, Unexamined Japanese Patent Application Laid-Open Specification No. 2-153923 discloses a method in which a combination of a thin film evaporation type apparatus and a horizontal agitation type polymerizer vessel is used.

Of these polymerizers, horizontal polymerizers, such as a screw evaporator and a horizontal agitation type polymerizer vessel, are intended to increase, by rotary agitation, the surface renewal of polymer (being formed) to a level as high as possible in an attempt to remove phenol and the like efficiently. For example, Examined Japanese Patent Application Publication No. 50-19600 describes that "A relatively large, continuously renewing interface is formed between the liquid reaction system and the ambient gas or vapor, so that a volatile reaction product formed in the liquid reaction system is extremely smoothly removed." (see page 1, right-hand column, lines 19 to 22 of the above patent document). That is, the above patent document suggests that phenol and the like can be efficiently removed by the renewal of gas-liquid interface. Further, in Examined Japanese Patent Application Publication No. 52-36159, the surface renewal effect is defined as the functions of the screw revolution rate, the screw surface area in the reaction zone, the total screw pitch number in the reaction zone, the feed amount of a raw material and the effective volume per screw pitch in the reaction zone, and it is described that it is limited. This is because when an increase in the size of the agitation type polymerizer is intended, it is necessarily required to increase the strength of the agitator and the motive power for agitation; however, it is limited to increase such strength and motive power. Therefore, with the use of an agitation type polymerizer, the production amount of the aromatic polycarbonate cannot be easily increased. That is, agitation type polymerizers have also a problem in that a scale-up of the production of an aromatic polycarbonate is difficult.

With respect to centrifugal film evaporators, Unexamined Japanese Patent Application Laid-Open Specification No. 2-153923 has a description to the effect that, by using a centrifugal film evaporator as a polycondensation reactor in the final stage of a transesterification reaction, the evaporation surface area of the liquid reaction system per unit weight of the liquid reaction system can be increased, thereby enabling a decrease in the residence time of the liquid reaction system in the reactor. However, the above patent document also points out the following problems. When a centrifugal film evaporator is used, a part of the polymer being formed sticks to the surfaces of a driving shaft, a blade, a bearing for the driving important that the respective values of the above-mentioned parameters be in specific ranges. However, in the case of these horizontal polymerizers, a rotary agitation force produced by, for example, a screw or an agitator is needed for increasing the surface renewal. It should be noted that the viscosity of an aromatic polycarbonate being formed markedly increases in accordance with the increase in the molecular weight thereof during the polymerization reaction, so that an extremely large agitation force becomes necessary. In addition, when a large agitation force is exerted on a polymer having a high viscosity, the polymer sustains a large shearing force and, hence, a breakage of the molecular chain occurs, so that the rate of the increase of the molecular weight becomes low, leading to a difficulty in obtaining an aromatic polycarbonate having a high molecular weight. Further, when an aromatic polycarbonate sustains a large shearing force, a discoloration of the polycarbonate and a lowering of the heat resistance thereof occur, so that the quality of the aromatic polycarbonate is seriously adversely affected. Furthermore, when the production of an aromatic polycarbonate by using an agitation type polymerizer is performed on a commercial scale, the size of the agitation type polymerizer is inevitably shaft, and the like, and is exposed to a thermal experience for a long period of time, so that the sticking part of the polymer is decomposed to form a black decomposition product, and the black decomposition product undesirably enters the polymer being produced. In order to obviate this problem, the above patent document discloses a method in which a centrifugal film evaporator is not used in the final stage of the reaction, but is used in the middle stage of the transesterification reaction. However, in this method, a film of a polymer is formed only on the inner wall surface of the evaporator and, hence, the volumetric efficiency of the evaporator as a polymerizer is extremely low, so that a satisfactory reaction time cannot be obtained without using a very large reactor. Thus, the centrifugal film evaporator cannot be suitably used on a commercial scale.

As described hereinabove, in the production of an aromatic polycarbonate by the transesterification process (which is free from the problems due to impurities and residual methylene chloride), when the transesterification process is performed by conventional production methods using a vertical agitation type polymerizer, a horizontal agitation type polymerizer, a centrifugal film evaporator or the like, various other problems arise such that phenol cannot be removed efficiently, that a very large motive power for agitation is needed, that the molecular chain of a polymer being formed is broken by the shearing force due to the very large motive power for agitation, resulting in a lowering of the rate of the increase of the molecular weight and in a discoloration of the polymer, that the Izod impact strength of the produced aromatic polycarbonate becomes low, and that, since an aromatic polycarbonate experiences a long thermal history, a heat decomposition product of the aromatic polycarbonate is likely to be formed, and the thus formed heat decomposition product undesirably enters the polymer being produced, that the volumetric efficiency of a polymerizer (i.e., the ratio of the volume of a liquid reaction system in the polymerizer to the inner volume of the polymerizer) is extremely low, and that a scale-up of the production of an aromatic polycarbonate is difficult.

With respect to the production of a polymer alloy of an aromatic polycarbonate and a resin other than an aromatic polycarbonate, Unexamined Japanese Patent Application Laid-Open Specification No. 5-239331 proposes a method in which the resin is added to a molten aromatic polycarbonate obtained by the above-mentioned melt polymerization method using a combination of the centrifugal film evaporator and the horizontal agitation type polymerizer, followed by mixing. In this method, since the aromatic polycarbonate is already in a molten state at the time of mixing thereof with the resin, it is possible to alleviate the problems, such as a heat deterioration of the aromatic polycarbonate and a discoloration of the shaped polymer alloy article, which inevitably occur when the aromatic polycarbonate in the form of pellets or powder is used to obtain the aromatic polycarbonate alloy. However, by this method, it is impossible to solve the above-mentioned problems which are likely to occur during the production of the aromatic polycarbonate, such as a discoloration of the polymer, and a formation of heat decomposition products due to the long thermal history of the aromatic polycarbonate and the entry of the formed heat decomposition products into the polymer being formed. Therefore, this method has problems such that the resultant shaped polymer alloy article is poor with respect to the color and that the lowering of Izod impact strength and the silver streaks are likely to occur during the molding of the aromatic polycarbonate alloy.

SUMMARY OF THE INVENTION

In this situation, for solving the above-mentioned problems of the prior art, the present inventors made extensive and intensive studies. As a result, they have unexpectedly found that, when an aromatic polycarbonate composition is produced by a method comprising:

(1) subjecting to a transesterification reaction in a polymerizer at least one polymerizable material selected from the group consisting of a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer, and wherein the transesterification reaction of the liquid mass of polymerizable material is being performed under conditions such that the following formula (1) is satisfied:

$$\log (S/V) \geq 2 \times 10^{-5} \times \bar{M}n + 0.8 \quad (1)$$

wherein:

S represents an evaporation surface area (m$^2$) which is defined as the area (m$^2$) of an exposed surface of the liquid mass of polymerizable material;

V represents the volume (m$^3$) of the liquid mass of polymerizable material in the polymerizer; and $\bar{M}n$ represents the number average molecular weight of the aromatic polycarbonate to be produced, thereby obtaining an aromatic polycarbonate (A) in molten form;

(2) adding to the obtained aromatic polycarbonate (A) in molten form a thermoplastic resin (B) other than an aromatic polycarbonate; and (3) kneading the aromatic polycarbonate (A) and the thermoplastic resin (B) together, it becomes possible to obtain a high quality aromatic polycarbonate composition in high production efficiency by virtue of advantages of the production process such that a large agitation force is not needed and that the volumetric efficiency of the polymerizer is high. In addition, the obtained aromatic polycarbonate composition is advantageous not only in that it has excellent color and contains no impurity or heat decomposition product, but also in that it is free from occurrence of disadvantageous phenomena during the molding thereof, such as occurrence of silver streaks and a lowering of the Izod impact strength. Based on this novel finding, the present invention has been completed.

Accordingly, it is a primary object of the present invention to provide an aromatic polycarbonate composition which not only can be produced in high efficiency, but also has excellent color and which is free from occurrence of disadvantageous phenomena during the molding thereof, such as occurrence of silver streaks and a lowering of the Izod impact strength.

The foregoing and other objects, features and advantages of the present invention will be apparent from the following detailed description and appended claims taken in connection with the accompanying drawings.

BRIEF DESCRIPTION OF THE DRAWINGS

In the drawings:

FIG. 2(b-1) is a diagrammatic view showing how to define the evaporation surface area S (m$^2$) in the mode of FIG. 2(a);

FIG. 2(b-2) is another diagrammatic view showing how to define the evaporation surface area S (m$^2$) in the mode of FIG. 2(a), as viewed from above the polymerizer shown in FIG. 2(b-1);

DESCRIPTION OF REFERENCE NUMERALS

Figure 1:
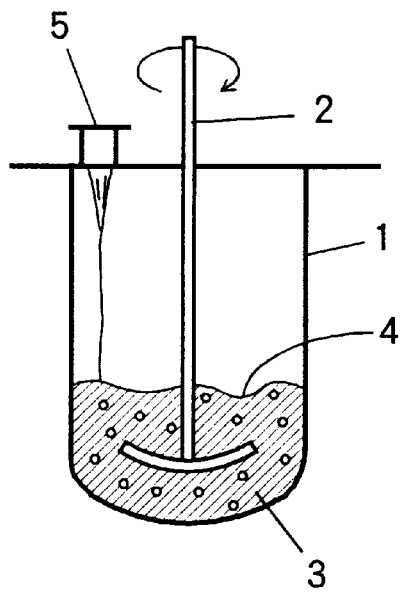
FIG. 1(a) is a diagrammatic view of one mode of the polymerization method used in the present invention for obtaining aromatic polycarbonate (A), explaining the evaporation surface area S (m$^2$) which is one of the requirements used for defining the above-mentioned polymerization method.
FIG. 1(b) is a diagrammatic view showing how to define the evaporation surface area S (m$^2$) in the mode of FIG. 1(a)
Figure 1:
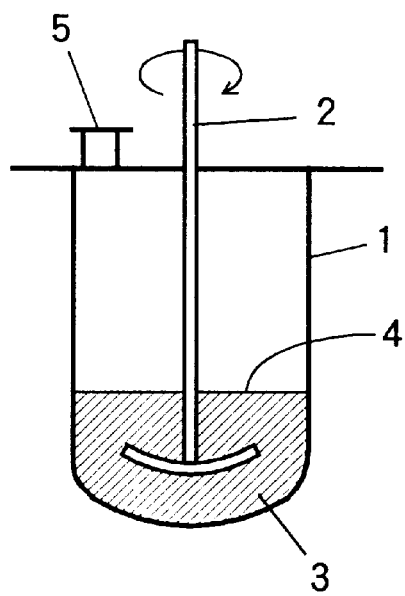

1: Polymerizer
2: Agitator
3: Polymerizable material
4: Horizontal liquid surface (evaporation surface) or flowing liquid surface (evaporation surface)
5: Inlet for a polymerizable material
6: Distributing plate
7: Plate-shaped guide
7A: Column-shaped guide
7B: Cone-shaped guide
7C: Cylindrical tubular guide
8: Gas feed port
9: Vent
10: Outlet
11: Shell chamber (space to be filled by a heating medium)
12: Heating medium feed port
13: Heating medium outlet port
14: Gear pump
15: Nozzle for withdrawal of a produced polymer
16: Extruder
17: First inlet
18: Second inlet
19: Vent
20: Gravimetric feeder
21: Side feeder
22: Die
23: Cooling bath
24: Strand cutter
25: Outlet for pellets obtained by cutting strands
26A–31A: Numerals assigned in connection with first vertical agitation type polymerizer vessel (A)
26B–31B: Numerals assigned in connection with first vertical agitation type polymerizer vessel (B)
26C–31C: Numerals assigned in connection with second vertical agitation type polymerizer vessel (C)
26D–31D: Numerals assigned in connection with third vertical agitation type polymerizer vessel (D)
26A, 26B: Inlet for a starting polymerizable material
26C, 26D: Inlet for a prepolymer
27A, 27B, 27C, 27D: Vent
28A, 28B: First vertical agitation type polymerizer vessels (A) and (B)
28C: Second vertical agitation type polymerizer vessel (C)
28D: Third vertical agitation type polymerizer vessel (D)
29A, 29B, 29C, 29D: Molten Prepolymer
30A, 30B, 30C, 30D: Outlet
31A, 31B, 31C, 31D: Agitator
32C, 32D, 34: Transfer pump
33: Inlet for a liquid

DETAILED DESCRIPTION OF THE INVENTION

According to the present invention, there is provided an aromatic polycarbonate composition which is substantially the same as that produced by a method comprising:

(1) subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer and wherein the liquid mass of polymerizable material being transesterified in the polymerizer has an exposed surface, the transesterification reaction of the liquid mass of polymerizable material being performed under conditions such that the following formula (1) is satisfied:

$$\log (S/V) \geq 2 \times 10^{-5} \times \overline{M}n + 0.8 \tag{1}$$

wherein:

S represents an evaporation surface area (m²) which is defined as the area (m²) of the exposed surface of the liquid mass of polymerizable material;

V represents the volume (m³) of the liquid mass of polymerizable material in the polymerizer; and $\overline{M}n$ represents the number average molecular weight of the aromatic polycarbonate to be produced, thereby obtaining an aromatic polycarbonate (A) in molten form;

(2) adding to the obtained aromatic polycarbonate (A) in molten form a thermoplastic resin (B) other than an aromatic polycarbonate; and (3) kneading the aromatic polycarbonate (A) and the thermoplastic resin (B) together.

For an easy understanding of the present invention, the essential features and various preferred embodiments of the present invention are enumerated below.

1. An aromatic polycarbonate composition which is substantially the same as that produced by a method comprising:

(1) subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer and wherein the liquid mass of polymerizable material being transesterified in the polymerizer has an exposed surface, the transesterification reaction of the liquid mass of polymerizable material being performed under conditions such that the following formula (1) is satisfied:

$$\log (S/V) \geq 2 \times 10^{-5} \times \bar{M}n + 0.8 \quad (1)$$

wherein:

S represents an evaporation surface area (m²) which is defined as the area (m²) of the exposed surface of the liquid mass of polymerizable material;

V represents the volume (m³) of the liquid mass of polymerizable material in the polymerizer; and $\bar{M}n$ represents the number average molecular weight of the aromatic polycarbonate to be produced, thereby obtaining an aromatic polycarbonate (A) in molten form;

(2) adding to the obtained aromatic polycarbonate (A) in molten form a thermoplastic resin (B) other than an aromatic polycarbonate; and (3) kneading the aromatic polycarbonate (A) and the thermoplastic resin (B) together.

2. The aromatic polycarbonate composition according to item 1 above, wherein the addition of the thermoplastic resin (B) to the aromatic polycarbonate (A) in step (2) and the kneading thereof in step (3) are conducted using an extruder having a first inlet and a second inlet, the second inlet being disposed down-stream of the first inlet as viewed in an extrusion direction of the extruder, and wherein the aromatic polycarbonate (A) and the thermoplastic resin (B) are fed to the extruder through the first inlet and the second inlet, respectively, and kneaded together in the extruder.

3. The aromatic polycarbonate composition according to item 1 or 2 above, wherein the thermoplastic resin (B) is a rubber-reinforced thermoplastic resin which comprises 10 to 100 parts by weight of a rubber graft copolymer obtained by a method comprising grafting on a rubber polymer at least one vinyl compound graft-copolymerizable with the rubber polymer, and 90 to 0 parts by weight of at least one vinyl polymer, and wherein the total amount of the rubber graft copolymer and the at least one vinyl polymer is 100 parts by weight.

4. The aromatic polycarbonate composition according to item 3 above, wherein the rubber-reinforced thermoplastic resin is an ABS resin.

5. The aromatic polycarbonate composition according to item 1 or 2 above, wherein the molten aromatic polycarbonate (A) and the thermoplastic resin (B) are kneaded together with a thermal stabilizer.

6. The aromatic polycarbonate composition according to item 1 or 2 above, wherein the molten aromatic polycarbonate (A) and the thermoplastic resin (B) are kneaded together with a thermal stabilizer and a phosphorus-containing flame retardant.

7. The aromatic polycarbonate composition according to item 2 above, wherein the feeding of the molten aromatic polycarbonate (A) to the extruder through the first inlet is conducted under pressure.

8. The aromatic polycarbonate composition according to item 2 or 3 above, wherein the thermoplastic resin (B) fed to the extruder through the second inlet is in non-molten form.

9. The aromatic polycarbonate composition according to item 3 above, wherein the thermoplastic resin (B) fed to the extruder through the second inlet is in non-molten form and wherein the kneading is conducted at a temperature of 280° C. or less.

10. The aromatic polycarbonate composition according to item 3 above, wherein the thermoplastic resin (B) has an ash content of 0.1% by weight.

In conventional methods for producing an aromatic polycarbonate by the transesterification process, for removing by-produced phenol and the like from the liquid reaction system efficiently, it has been attempted to increase the surface renewal of the polymer (being formed) by a very powerful rotary agitation, using horizontal polymerizers as mentioned above. However, it has surprisingly been found that, by performing the transesterification process by the use of a polymerizer suitable for achieving and maintaining the reaction conditions satisfying the relationship defined by formula (1) above, wherein there is no need for a very large motive power for agitation, a high quality aromatic polycarbonate having high heat resistance can be obtained at a high polymerization rate without suffering discoloration, entry of impurities and generation of a thermal decomposition product. Therefore, in the production process employed in the present invention, since the excellent aromatic polycarbonate produced by the above-mentioned specific method is kneaded with a thermoplastic resin other than an aromatic polycarbonate under conditions wherein the produced aromatic polycarbonate is still in a molten state, it is possible to produce a high quality aromatic polycarbonate composition in high production efficiency without suffering from the problems accompanying conventional aromatic polycarbonate compositions produced using an aromatic polycarbonate produced by a conventional technique. The high quality aromatic polycarbonate composition of the present invention is advantageous not only in that it has excellent color and contains no impurity or thermal decomposition product, but also in that it is free from the occurrence of disadvantageous phenomena during the molding thereof, such as occurrence of silver streaks and a lowering of the Izod impact strength.

In the present invention, the terminology "aromatic dihydroxy compound" means a compound represented by the following formula:

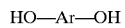

wherein Ar represents a divalent aromatic group having from 5 to 200 carbon atoms.

Preferred examples of divalent aromatic groups as Ar include a group represented by the following formula:

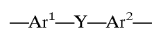

wherein each of $Ar^1$ and $Ar^2$ independently represents a divalent carbocyclic or heterocyclic aromatic group having from 5 to 70 carbon atoms, and Y represents a divalent alkane group having from 1 to 30 carbon atoms.

In the divalent carbocyclic or heterocyclic aromatic groups as $Ar^1$ and $Ar^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Illustrative examples of heterocyclic aromatic groups $Ar^1$ and $Ar^2$ include an aromatic group having at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups Y include organic groups respectively represented by the following formulae:

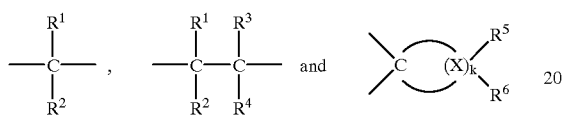

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different;

wherein at least one hydrogen atom of each of $R^1$, $R^2$, $R^3$, $R^4$, $R^5$ and $R^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Specific examples of divalent aromatic groups Ar include groups respectively represented by the following formulae:

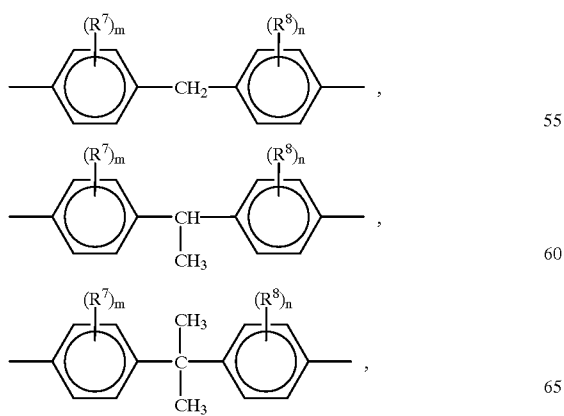

-continued

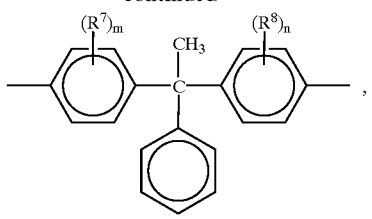

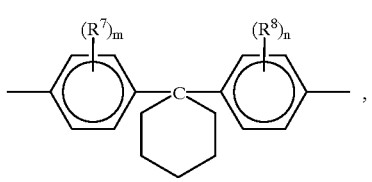

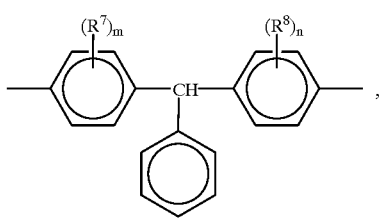

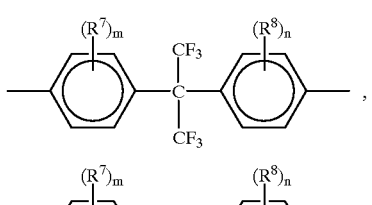

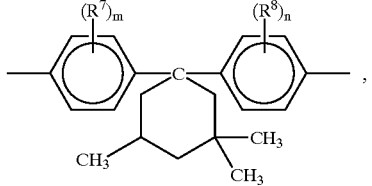

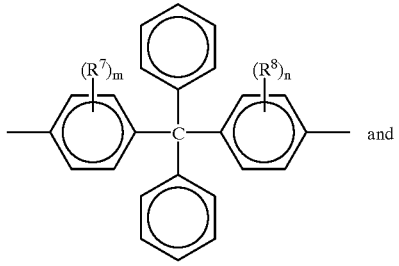

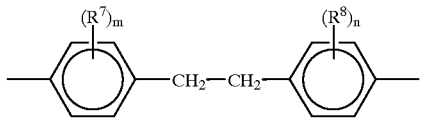

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further, examples of divalent aromatic groups Ar also include those which are represented by the following formula:

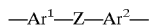

wherein $Ar^1$ and $Ar^2$ are as defined above; and Z represents a single bond or a divalent group, such as —O—, —CO—, —S—, —SO$_2$—, —SO—, —COO—, or —CON(R$^1$)—, wherein $R^1$ is as defined above.

Specific examples of such divalent aromatic groups Ar include groups respectively represented by the following formulae:

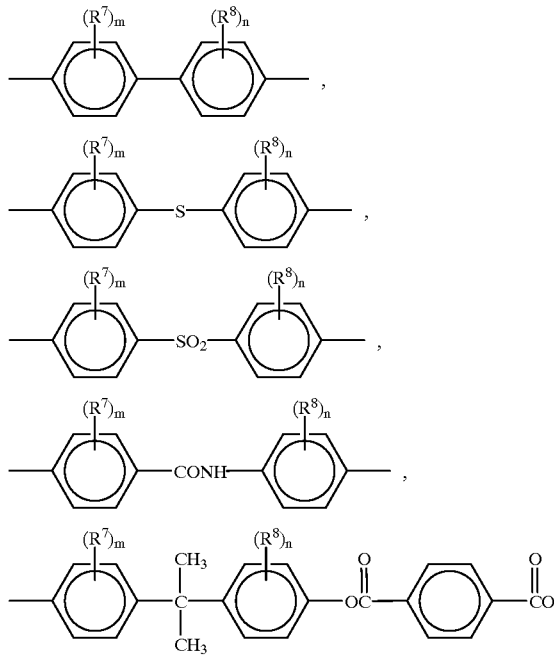

wherein $R^7$, $R^8$, m and n are as defined above.

In the method of the present invention, the aromatic dihydroxy compounds can be used individually or in combination. Representative examples of aromatic dihydroxy compounds include bisphenol A.

The diaryl carbonate used in the present invention is represented by the following formula:

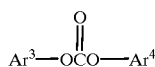

wherein each of $Ar^3$ and $Ar^4$ independently represents a monovalent aromatic group having from 5 to 200 carbon atoms.

In each of $Ar^3$ and $Ar^4$ which independently represents a monovalent carbocyclic or heterocyclic aromatic group, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups $Ar^3$ and $Ar^4$ are those which are respectively represented by the following formulae:

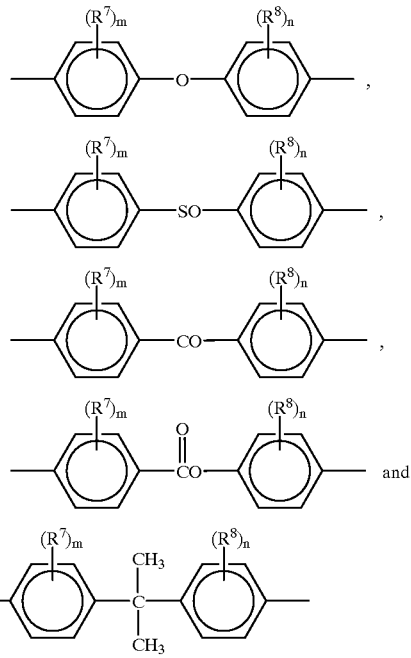

and

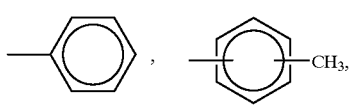

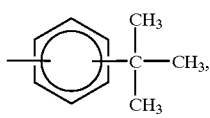

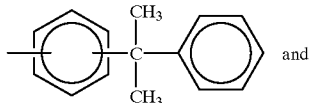

and

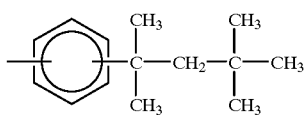

Representative examples of diaryl carbonates include a substituted or unsubstituted diphenyl carbonate compound represented by the following formula:

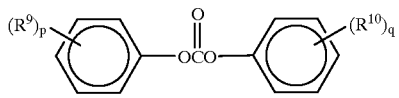

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diaryl carbonate compounds, preferred are diaryl carbonates having a symmetrical configuration, such as (unsubstituted) diphenyl carbonate and a diphenyl carbonate substituted with a lower alkyl group, e.g., ditolyl carbonate and di-tert-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e. a charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of aromatic polycarbonate (A) obtained in step (1) of the method used in the present invention is generally from 500 to 100,000, preferably from 2,000 to 30,000.

As mentioned above, in the present invention, as a raw material for obtaining aromatic polycarbonate (A), use is made of at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate.

Even when a monomer mixture of an aromatic dihydroxy compound and a diaryl carbonate is simply melted by heating, a polymerization reaction proceeds to some extent. Therefore, a molten monomer mixture of an aromatic dihydroxy compound and a diaryl carbonate is substantially equivalent to a molten prepolymer. In this sense, the polymerizable material is hereinafter, frequently referred to as "prepolymer". Further, when the prepolymer is one which has a polymerization degree which is being increased by the transesterification reaction, the prepolymer is hereinafter, occasionally referred to simply as "polymer".

The molten prepolymer used in the present invention as a polymerizable material may be one obtained by any conventional polymerization method.

In the present invention, the evaporation surface area S (m$^2$) is an index of the area of the interface between the polymer liquid phase and the gas phase, and is defined as the area of the exposed surface of the liquid mass of polymerizable material. Usually, a gas-liquid interface assumes a wavy, complicated configuration due to the agitation, turbulence, foaming or the like, so that it is difficult to measure the area of the gas-liquid interface precisely. However, in the present invention, the area of the exposed surface of the liquid mass, that is, the evaporation surface area S (m$^2$), is determined on the assumption that the liquid polymer is in a stationary state in which there is no agitation, turbulence, foaming or the like.

Illustrative explanation will be made below on how to determine the evaporation surface area S (m$^2$) defined in the present invention.

In the present invention, even when the surface of the polymer liquid in the polymerizer is in a wavy state due to the agitation, turbulence, foaming or the like, assuming that the horizontal or flown-down liquid surface is in a stationary smooth state in which no agitation, turbulence, foaming or the like occurs, the area of the horizontal or flown-down smooth liquid surface (m$^2$) is taken as the evaporation surface area S (m$^2$).

When the reaction is performed in a wetting fall mode, the polymer liquid in the polymerizer is caused to fall along and in contact with a part or entire of a surface (hereinafter, frequently referred to as "polymer-flowing wall surface") of a solid object selected from the group consisting of an inner wall of the polymerizer and a guide. In this case, it is assumed that the polymer liquid has a uniform thickness and forms a flowing liquid surface having a configuration which is congruent with or homothetic to the configuration of the polymer-flowing wall surface. (For example, when a high viscosity polymer liquid is caused to flow down along a wire, the flowing polymer liquid has a peripheral configuration larger than and homothetic to the peripheral configuration of the wire.) The area (m$^2$) of such a flowing liquid surface of the polymer liquid is taken as the evaporation surface area S (m$^2$) of the flowing polymer liquid. Specifically, when the polymer-flowing wall surface is a plane, the area (m$^2$) of a planar flowing liquid surface is the evaporation surface area S (m$^2$) of the flowing polymer liquid. When the polymer-flowing wall surface is cylindrical, the area (m$^2$) of a cylindrical flowing liquid surface is the evaporation surface area S (m$^2$) of the flowing polymer liquid. It should be noted that when the area of the flowing liquid surface of the polymer liquid (i.e., the evaporation surface area S of the flowing polymer liquid) is directly obtained from the area of the polymer-flowing wall surface, possible tiny bumps and dents (of a size of up to several hundred μm) on the polymer-flowing wall surface are disregarded, and the polymer-flowing wall surface is assumed to be smooth. Further, in the determination of the area of the flowing liquid surface of the polymer liquid (i.e., the evaporation surface area S of the flowing polymer liquid), it is also assumed that, when the polymer flows down along the polymer-flowing wall surface, the liquid mass of the polymer does not become widened in a direction perpendicular to the flow direction, but flows while maintaining the same width as at the starting point of the flowing down. For example, in the determination of the area of the flowing liquid surface of the flowing polymer liquid (i.e., the evaporation surface area S of the flowing polymer liquid), it is assumed that, when a prepolymer is fed to a cylindrical polymerizer through a prepolymer inlet positioned at an upper side-wall of the polymerizer, the polymer flows down along the inner wall surface of the polymerizer to the bottom of the polymerizer while maintaining the same width as at the time the polymer flows out from the inner opening of the prepolymer inlet. The width of the flowing polymer liquid at the time the polymer flows out from the inner opening of the prepolymer inlet varies depending on the viscosity of the prepolymer, the feeding rate of the prepolymer and the design of the prepolymer inlet. In the present invention, when the polymer liquid falls freely in the polymerizer in the form of a filament or a droplet (wherein the polymer liquid does not fall along and in contact with an inner wall surface of the polymerizer or the surface of a guide), the gas-liquid interface of the freely falling polymer liquid is not included in the evaporation surface area S (m$^2$) defined in the present invention. Further, when the falling liquid mass of polymer has a portion which does not fall along and in contact with an inner wall surface of the polymerizer or the surface of a guide but falls freely, the area of the exposed surface of the liquid mass of the polymer in such a portion is not included in the evaporation surface area S (m$^2$) defined in the present invention. When a plurality of guides provide a plurality of flowing liquid surfaces, the total area S (m$^2$) of all of the plurality of flowing liquid surfaces is the evaporation surface area S (m$^2$) defined in the present invention.

When a polymer liquid having a horizontal liquid surface is present in the bottom portion of the polymerizer in addition to a polymer liquid flowing down along the polymer-flowing wall surface and having a flowing liquid surface, the total area of the horizontal liquid surface and the flowing liquid surface is the evaporation surface area S (m$^2$) defined in the present invention.

Figure 7:
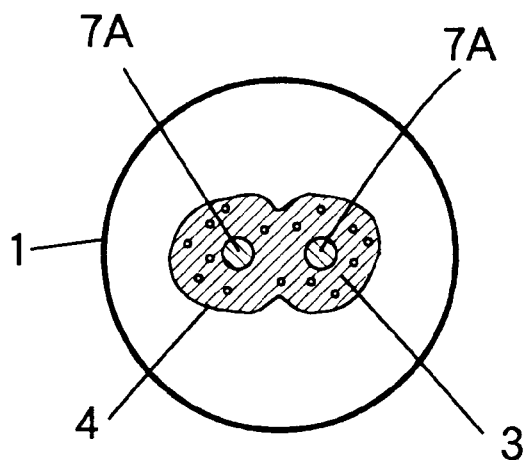
FIG. 7(a) is a diagrammatic cross-sectional view of a further mode of the polymerization method for obtaining aromatic polycarbonate (A), explaining the evaporation surface area S (m²) which is one of the requirements used for defining the above-mentioned polymerization method.
FIG. 7(b) is a diagrammatic cross-sectional view showing how to define the evaporation surface area S (m²) in the mode of FIG. 7(a)
Figure 7:
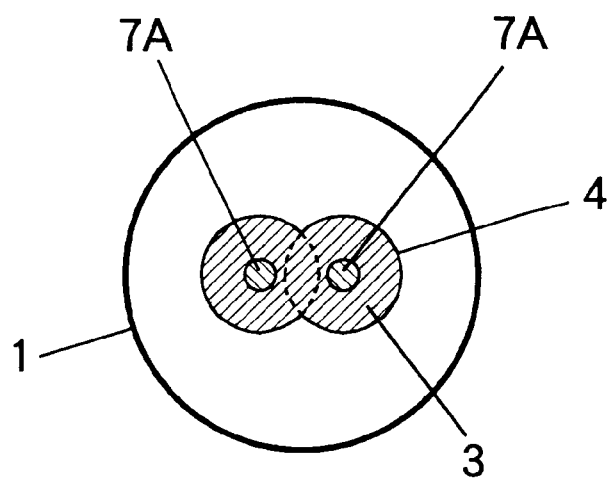

Further, in the determination of the evaporation surface area S, when one flowing liquid surface (on one polymer-flowing wall surface) interferes with another flowing liquid surface (on another polymer-flowing wall surface) to thereby produce respective portions of both the flowing liquid surfaces which portions are not exposed to the gas phase, the areas of such portions of the flowing liquid surfaces are not included in the evaporation surface area S (m$^2$) defined in the present invention [see, for example, FIGS. 7(a) and 7(b)].

In the present invention, the volume V (m$^3$) of the liquid mass of polymerizable material means the volume of polymer which is present in the polymerizer and substantially participates in the reaction. The volume V (m$^3$) of the liquid mass defined in the present invention does not include the volume of the polymer liquid which is present in the pipes and the like which are connected to the polymerizer and used for transporting or temporarily accumulating the polymer liquid.

Referring to the drawings, more illustrative explanation will be made below on how to determine the evaporation surface area S (m$^2$) and the volume V (m$^3$) of the liquid mass of polymerizable material, both defined in the present invention.

FIG. 1(a) is a diagrammatic view of a vertical agitation type polymerizer, showing a polymerization process in which a prepolymer is fed in a volume of V (m$^3$) in the form of a filament through inlet 5 into the polymerizer, while agitating the prepolymer in the polymerizer, so that a wavy, complicated gas-liquid interface is formed by agitation and foaming. FIG. 1(b) shows an imaginary state, in which a prepolymer having the same V (m$^3$) as in FIG. 1(a) is not agitated, and there is no foaming, so that a stationary smooth gas-liquid interface is formed in the polymerizer. In the present invention, when the polymerization is performed by a process as shown in FIG. 1(a), the evaporation surface area S (m$^2$) is determined on the assumption that the evaporation surface is stationary smooth surface 4 as shown in FIG. 1(b).

In the polymerization process shown in FIG. 1(a), when the polymerization is performed in a continuous manner, the volume V (m$^3$) can be obtained by a method in which the weight of the polymer liquid in the polymerizer is obtained by subtracting the total weight of a polymer withdrawn from the polymerizer, an evaporated substance, such as a by-produced, evaporated aromatic monohydroxy compound, and a prepolymer in the conduits (arranged in the polymerizer) and the like from the weight of the prepolymer fed to the polymerizer; and the weight of the polymer liquid in the polymerizer is then converted to the volume thereof, using the specific gravity of the polymer liquid as measured at the polymerization temperature. [In addition to the evaporated monohydroxy compound, the above-mentioned evaporated substance may also contain small amounts of a diaryl carbonate, an aromatic dihydroxy compound and an extremely low molecular weight prepolymer (oligomer), depending on the polymerization conditions.] The amount of the evaporated aromatic monohydroxy compound can be obtained by measuring the weight of a condensate of the whole of the evaporated substance (including the by-produced aromatic monohydroxy compound) distilled off through a vent of the polymerizer. In the present invention, the specific gravity of the polymer liquid (at the polymerization temperature) in the polymerizer is assumed to be 1,100 kg/m$^3$. When the polymerization is performed in a batchwise manner, the volume V (m$^3$) can be obtained by a method in which the weight of the polymer liquid in the polymerizer is obtained by subtracting the total weight of an evaporated substance, such as a by-produced, evaporated aromatic monohydroxy compound, and a prepolymer in the conduits and the like from the weight of the prepolymer charged to the polymerizer; and the weight of the polymer liquid in the polymerizer is then converted to the volume thereof, using the specific gravity (1,100 kg/m$^3$) of the polymer liquid as measured at the polymerization temperature.

Figure 2A:
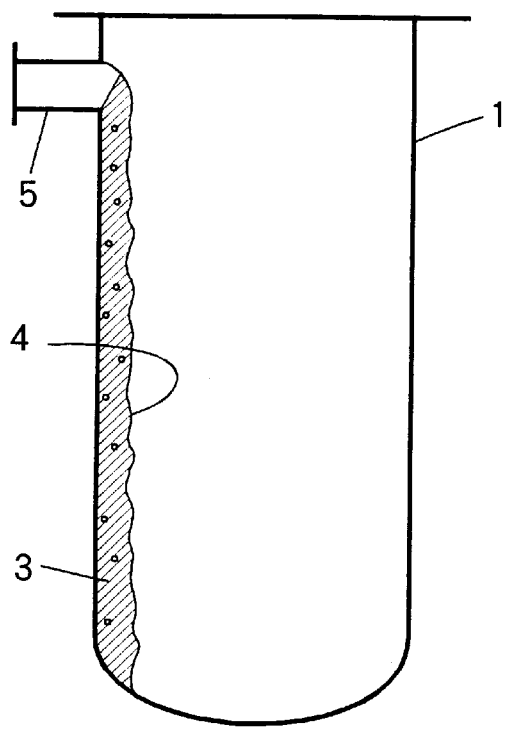
FIG. 2(a) is a diagrammatic view of another mode of the polymerization method used in the present invention for obtaining aromatic polycarbonate (A), explaining the evaporation surface area S (m$^2$) which is one of the requirements used for defining the above-mentioned polymerization method.
Figure 2A:
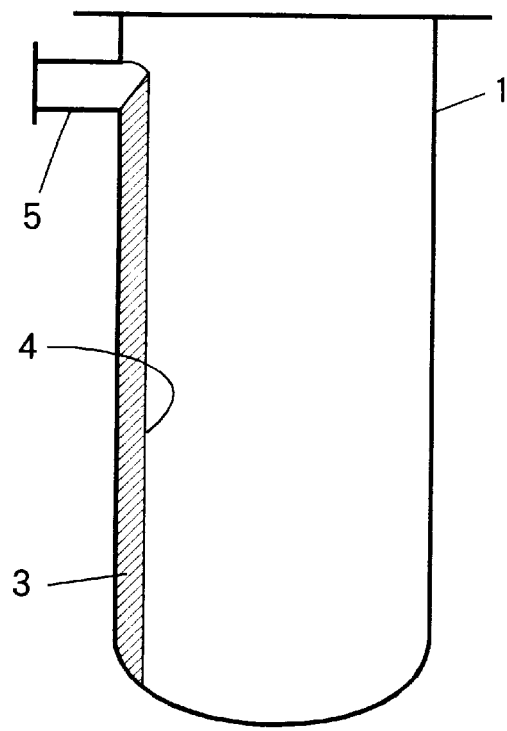
Figure 2A:
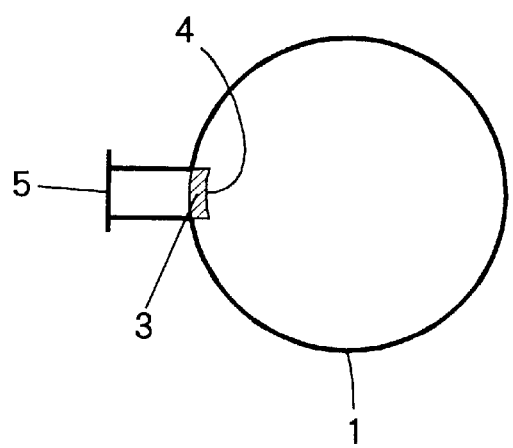

FIG. 2(a) shows one mode of a wall-wetting fall polymerization process, in which a prepolymer falls along and in contact with an inner wall of a cylindrical polymerizer. In FIG. 2(b-1) and FIG. 2(b-2), the process of FIG. 2(a) is illustrated on the assumption that the prepolymer of the same volume as in FIG. 2(a), which falls along and in contact with the inner wall of the cylindrical polymerizer, is present in the form of a liquid mass having a uniform thickness and having a flowing liquid surface 4 having an arc configuration in cross-section, but not in the form of a wavy liquid mass as shown in FIG. 2(a). In the present invention, when the polymerization is performed by a process as shown in FIG. 2(a), the evaporation surface area S (m$^2$) is determined on the assumption that the evaporation surface is flowing liquid surface 4 having an arc configuration in cross-section as shown in FIG. 2(b-1) and FIG. 2(b-2). The areas of the side surfaces of the liquid mass shown in FIG. 2(b-2), which side surfaces extend along the thicknesswise direction of the liquid mass and are substantially perpendicular to flowing liquid surface 4, are not included in the evaporation surface area S (m$^2$), because each of these side surfaces does not have a configuration which is congruent with or homothetic to the polymer-flowing wall surface of the polymerizer. Further, as in FIG. 2(b-2), in the present invention, it is assumed that the prepolymer fed through the prepolymer inlet to the polymerizer falls down along the inner wall surface of the polymerizer while maintaining the same width as at the time the prepolymer flows out from the inner opening of the prepolymer inlet, and without spreading in the direction along the curvature of the inner wall surface of the polymerizer.

In the polymerization process shown in FIG. 2(a), when the polymerization is performed in a continuous manner, the volume V (m³) can be obtained by a method in which the weight of the polymer liquid in the polymerizer is obtained by subtracting the total weight of a polymer withdrawn from the polymerizer, an evaporated substance, such as a by-produced, evaporated aromatic monohydroky compound, and a prepolymer in the conduits (arranged in the polymerizer) and the like from the weight of the prepolymer fed to the polymerizer; and the weight of the liquid in the polymerizer is then converted to the volume thereof, using the specific gravity (1,100 kg/cm³) of the polymer liquid as measured at the polymerization temperature. When the polymerization is performed in a batchwise manner, the volume V (m³) can be obtained by a method in which the weight of the polymer liquid in the polymerizer is obtained by subtracting the total weight of an evaporated substance, such as a by-produced, evaporated aromatic monohydroxy compound, and a prepolymer in the conduits and the like from the weight of the prepolymer fed to the polymerizer; and the weight of the polymer liquid in the polymerizer is then converted to the volume thereof, using the specific gravity (1,100 kg/m³) of the polymer liquid as measured at the polymerization temperature.

FIG. 7(a) is a diagrammatic horizontal cross-sectional view of a polymerizer, showing a polymerization process performed by allowing a polymer liquid to fall along and in contact with each of mutually adjacent two column-shaped guides, wherein the respective wavy flowing liquid surfaces on the two column-shaped guides 7A interfere with each other to thereby produce respective portions of both the wavy flowing liquid surfaces which portions are not exposed to the gas phase. In FIG. 7(b), the process of FIG. 7(a). is illustrated on the assumption that the polymer liquid of the same volume as in FIG. 7(a) falls along and in contact with the column-shaped guides 7A in the form of mutually overlapping two cylindrical liquid masses of polymer, but not in the form of a wavy liquid mass as shown in FIG. 7(a). In the present invention, the respective portions of both the cylindrical flowing liquid surfaces shown in FIG. 7(b), which are indicated by using the broken lines, are not included in the evaporation surface area S (m²), because these portions are not exposed to the gas phase. In the present invention, the area of the exposed surface 4 of the polymer liquid, indicated by using the solid line in FIG. 7(b), is taken as the evaporation surface area S (m²).

In step (1) for producing aromatic polycarbonate (A), the polymerization is performed under reaction conditions such that the evaporation surface area S (m²), the volume V (m³) of the liquid mass of polymerizable material in the polymerizer, and the number average molecular weight (Mn) of aromatic polycarbonate (A) to be produced satisfy the relationships represented by the following formula (I):

$$\log (S/V) \geq 2 \times 10^{-5} \times \bar{M}n + 0.8 \qquad (I).$$

[It should be noted that formula (I) above is valid only when the unit of the evaporation surface area S is m² and the unit of the volume V of the liquid mass is m³.] The formula (I) is an empirical formula obtained by the present inventors in their production of polycarbonates having various average molecular weights under various polymerization conditions in which the S (m²)/V (m³) ratio was varied. When the polymerization is performed under conditions in which the S (m²)/V (m³) ratio is outside the range as defined in the formula (I), it becomes difficult to produce a high quality polycarbonate having high heat resistance at high polymerization rate without suffering discoloration, entry of impurities and generation of a heat decomposition product.

With respect to the type of the polymerizer used in the present invention, there is no particular limitation as long as reaction conditions which satisfy the above-mentioned formula (I) can be achieved and maintained. However, it is especially preferred to use a polymerizer designed for performing a polymerization by allowing a polymer liquid to fall along and in contact with a surface of a guide. It is more preferred that the above-mentioned type of polymerizer have a plurality of guides. Examples of the shapes of the guide used in such a polymerizer include a plate, a cylinder, a cone, a chain and the like. Further, for example, the guide may be hollow. In the case of the hollow guide, for example, the polymerization may be performed by allowing a polymer liquid to fall along and in contact with an outer wall surface of the hollow guide, while introducing a heating medium to the hollow portion of the guide, or the polymerization may be performed by allowing a polymer liquid to fall along and in contact with an inner wall surface of the hollow guide, while applying a heating medium to the outer wall of the hollow guide.

In step (1) for producing aromatic polycarbonate (A), a single polymerizer which is constructed so as to achieve and maintain reaction conditions satisfying the formula (I) may be used, or a plurality of such polymerizers may be used. Further, a polymerizer which is constructed so as to achieve and maintain reaction conditions satisfying the requirements of the present invention may be used in combination with other polymerizers for producing aromatic polycarbonate (A). In the present invention, step (1) can be advantageously performed especially when the polymerizable material used has a relatively high viscosity (specifically, a polymerizable material having a number average molecular weight of about 1,500 or more). Therefore, in one preferred mode of the method in step (1), a prepolymer having a number average molecular weight not less than about 1,500 is produced by reacting an aromatic dihydroxy compound with a diaryl carbonate using, for example, a vertical agitation type polymerizer, and then the obtained prepolymer is polymerized using a polymerizer which is constructed so as to achieve and maintain reaction conditions satisfying the requirements of the present invention.

Hereinbelow, explanation is made with respect to specific examples of polymerizers usable in the present invention with reference to FIGS. 3(a) and 3(b), FIGS. 4(a) and 4(b), FIG. 5, and FIGS. 6(a) and 6(b). However, in the present invention, the polymerizer is not limited to those specific examples.

Figure 3A:
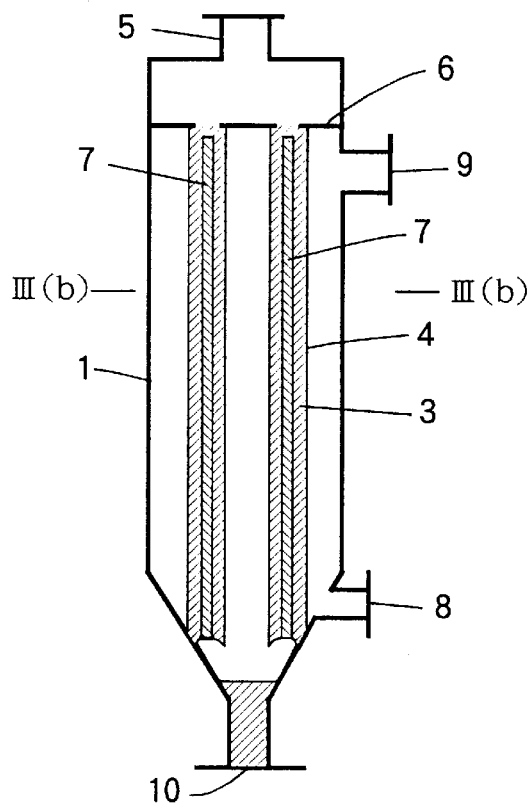
FIG. 3(a) is a diagrammatic cross-sectional view of one form of polymerizer usable in the polymerization method for obtaining aromatic polycarbonate (A)
Figure 3B:
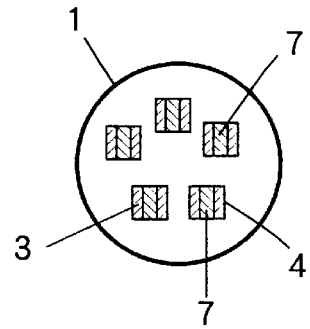
FIG. 3(b) is a diagrammatic cross-sectional view of the polymerizer of FIG. 3(a), taken along the line III(b)—III(b)
Figure 4A:
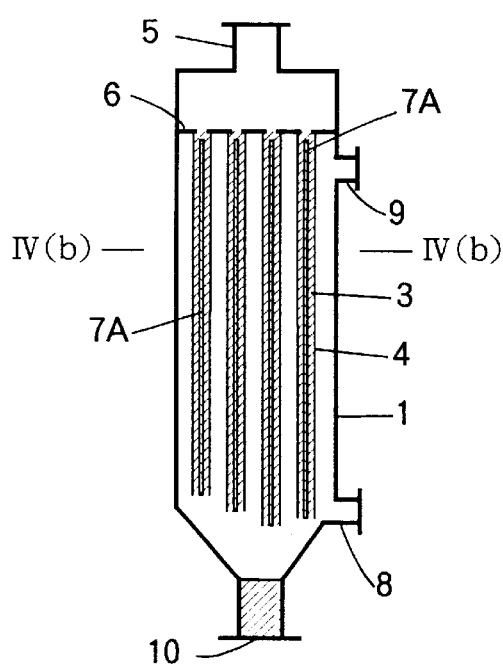
FIG. 4(a) is a diagrammatic cross-sectional view of another form of polymerizer usable in the polymerization method for obtaining aromatic polycarbonate (A)
Figure 4B:
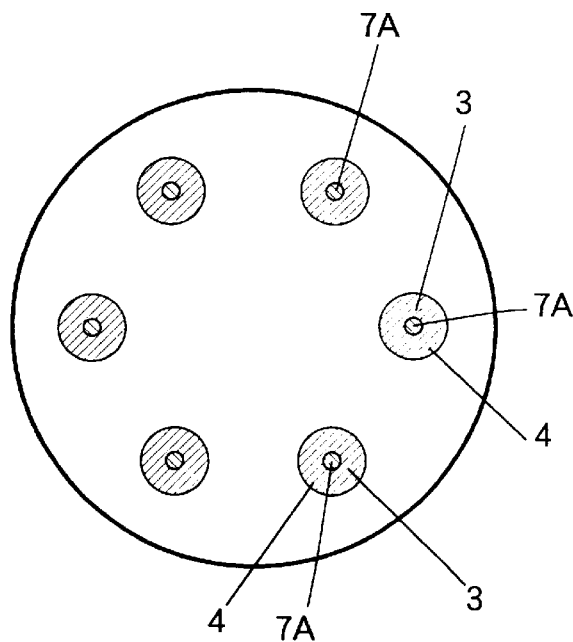
FIG. 4(b) is an enlarged diagrammatic cross-sectional view of the polymerizer of FIG. 4(a), taken along the line IV(b)—IV(b)

FIG. 3(a) and FIG. 3(b) show polymerizer 1 having a plurality of plate-shaped guides 7, along and in contact with which prepolymer 3 is to be allowed to fall. FIG. 3(a) is a diagrammatic vertical cross-sectional view of polymerizer 1, showing longitudinal cross-sections of the plate-shaped guides 7 taken in a thicknesswise direction thereof. FIG. 3(b) is a diagrammatic cross-sectional view of the polymerizer of FIG. 3(a), taken along the line III(b)—III(b). In FIG. 3(a), prepolymer 3 is fed through inlet 5 onto distributing plate 6 having holes, and is distributed by distributing plate 6 to the plurality of plate-shaped guides 7. Prepolymer 3 is allowed to fall along and in contact with both opposite flat surfaces of each plate-shaped guide 7. A by-produced aromatic monohydroxy compound and the like are evaporated from evaporation surface 4 of prepolymer 3. The interior of polymerizer 1 is maintained at reduced pressure. Not only an aromatic monohydroxy compound as by-product and the like, but also an inert gas, which is optionally fed from gas feed port 8, is discharged through vent 9. A polymer which has had its molecular weight increased during the guide-wetting fall thereof is discharged through outlet 10. It is requisite that the volume V (m³) and the evaporation surface area S (m²) of the liquid mass of the polymerizable material in the polymerizer, and the number average molecular weight $\overline{M}n$ of the polymer discharged from the polymerizer satisfy the relationship of the above-mentioned formula (I). The discharged polymer may be recirculated to inlet 5 and again allowed to fall along and in contact with plate-shaped guides 7 to further increase the molecular weight of the polymer. The polymerization may be performed in either a batchwise manner or a continuous manner. When the polymerization is performed in a batchwise manner, a polymer discharged from the polymerizer may be repeatedly recirculated to inlet 5. When the polymerization is performed in a continuous manner, it is possible that prepolymer 3 is continuously fed through inlet 5 and a polymer which has had its molecular weight increased during the guide-wetting fall thereof is continuously discharged through outlet 10. Alternatively, in the continuous manner practice, it is also possible that fresh prepolymer 3 is continuously fed through inlet 5, and a part of a discharged polymer which has had its molecular weight increased during the guide-wetting fall thereof is continuously recirculated to and fed through inlet 5 together with continuously fed fresh prepolymer 3, while continuously withdrawing the remainder of the discharged polymer from polymerizer 1 through outlet 10. The polymerizer is heated to and kept at an elevated temperature by means of a heater or a jacket (not shown). Guide 7 can be fixed, for example, to distributing plate 6 or to a wire hung from the upper inner wall of the polymerizer.

The use of this type polymerizer is commercially advantageous, since the production rate of aromatic polycarbonate can be easily increased by increasing the surface area of plate-shaped guide 7 or increasing the number of plate-shaped guides 7, so that a scale-up of the production can be easily performed.

FIG. 4(*a*) and FIG. 4(*b*) show polymerizer 1 having a plurality of column-shaped guides 7A, along and in contact with which prepolymer 3 is to be allowed to fall. FIG. 4(*a*) is a diagrammatic vertical cross-sectional view of polymerizer 1. FIG. 4(*b*) is a diagrammatic cross-sectional view of the polymerizer of FIG. 4(*a*), taken along the line IV(b)—IV(b). In FIG. 4(*a*), prepolymer 3 is fed through inlet 5 onto distributing plate 6 having holes, and is distributed by distributing plate 6 to the plurality of column-shaped guides 7A. Prepolymer 3 is allowed to fall along and in contact with the surface of each column-shaped guide 7A. A by-produced aromatic monohydroxy compound and the like are evaporated from evaporation surface 4 of prepolymer 3. The interior of polymerizer 1 is maintained at reduced pressure. Not only an aromatic monohydroxy compound as by-product and the like, but also an inert gas, which is optionally fed from gas feed port 8, is discharged through vent 9. A polymer which has had its molecular weight increased during the guide-wetting fall thereof is discharged through outlet 10. It is requisite that the volume V (m³) and the evaporation surface area S (m²) of the liquid mass of the polymerizable material in the polymerizer, and the number average molecular weight $\overline{M}n$ of the polymer discharged from the polymerizer satisfy the relationship of the above-mentioned formula (I). The discharged polymer may be recirculated to inlet 5 and again allowed to fall along and in contact with column-shaped guides 7A to further increase the molecular weight of the polymer. The polymerization may be performed in either a batchwise manner or a continuous manner. When the polymerization is performed in a batchwise manner, a polymer discharged from the polymerizer may be repeatedly recirculated to inlet 5. When the polymerization is performed in a continuous manner, it is possible that prepolymer 3 is continuously fed through inlet 5 and a polymer which has had its molecular weight increased during the guide-wetting fall thereof is continuously discharged through outlet 10. Alternatively, in the continuous manner practice, it is also possible that fresh prepolymer 3 is continuously fed through inlet 5, and a part of a discharged polymer which has had its molecular weight increased during the guide-wetting fall thereof is continuously recirculated to and fed through inlet 5 together with continuously fed fresh prepolymer 3, while continuously withdrawing the remainder of the discharged polymer from polymerizer 1 through outlet 10. The polymerizer is heated to and kept at an elevated temperature by means of a heater or a jacket (not shown). Guide 7A can be fixed, for example, to distributing plate 6 or to a wire hung from the upper inner wall of the polymerizer.

The use of this type polymerizer is commercially advantageous, since the production rate of aromatic polycarbonate (A) can be easily increased by increasing the number of column-shaped guides 7A, so that a scale-up of the production can be easily performed.

Figure 5:
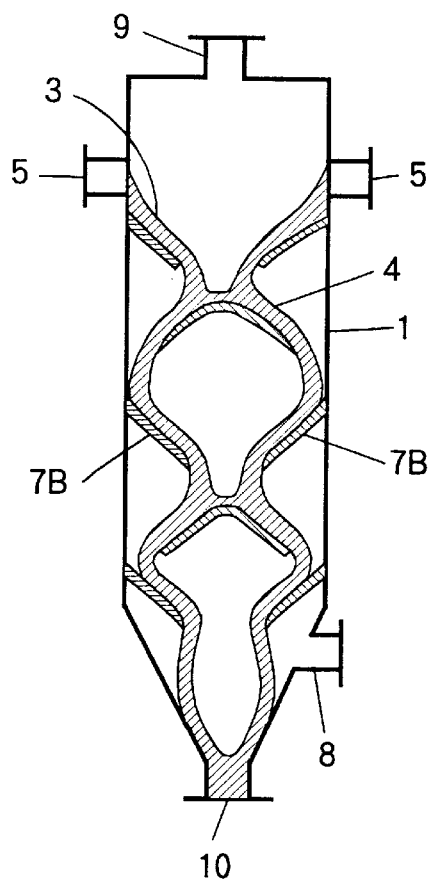
FIG. 5 is a diagrammatic cross-sectional view of still another form of polymerizer usable in the polymerization method for obtaining aromatic polycarbonate (A)

FIG. 5 shows polymerizer 1 having a plurality of cone-shaped guides 7B, along and in contact with which prepolymer 3 is to be allowed to fall. FIG. 5 is a diagrammatic vertical cross-sectional view of polymerizer 1. In FIG. 5, prepolymer 3 is fed through a pair of opposite inlets 5 and allowed to fall along and in contact with the uppermost first-stage cone-shaped guide. Then, prepolymer 3, which has left the upper-most first-stage cone-shaped guide 7B, reaches the second-stage cone-shaped guide 7B and is allowed to fall along and in contact with the second-stage cone-shaped guide. In this manner, the prepolymer falls along and in contact with the vertically arranged several cone-shaped guides 7B successively until it reaches the bottom of the polymerizer. A by-produced aromatic monohydroxy compound and the like are evaporated from evaporation surface 4 of prepolymer 3. The interior of polymerizer 1 is maintained at reduced pressure. Not only an aromatic monohydroxy compound as by-product and the like, but also an inert gas, which is optionally fed from gas feed port 8, is discharged through vent 9. A polymer which has had its molecular weight increased during the guide-wetting fall thereof is discharged through outlet 10. It is requisite that the volume V (m³) and the evaporation surface area S (m²) of the liquid mass of the polymerizable material in the polymerizer, and the number average molecular weight $\overline{M}n$ of the polymer discharged from the polymerizer satisfy the relationship of the above-mentioned formula (I). In this mode of the method of the present invention, at the transition of the prepolymer from a higher stage cone-shaped guide to a lower stage cone-shaped guide, the prepolymer has a portion which does not fall along and in contact with any guiding surface of a cone-shaped guide, but falls freely. As mentioned above, the exposed surface area of such a free-falling portion of the prepolymer is not included in the evaporation surface area S as defined in the present invention. The discharged polymer may be recirculated to inlets 5 and again allowed to fall along and in contact with cone-shaped guides 7B to further increase the molecular weight of the polymer. The polymerization may be performed in either a batchwise manner or a continuous manner. When the polymerization is performed in a batchwise manner, a polymer discharged from the polymerizer may be repeatedly recirculated to inlets 5. When the polymerization is performed in a continuous manner, it is possible that prepolymer 3 is continuously fed through a pair of opposite inlets 5 and a polymer which has had its molecular weight increased during the guide-wetting fall thereof is continuously discharged through outlet 10. Alternatively, in the continuous manner practice, it is also possible that fresh prepolymer 3 is continuously fed through inlets 5, and a part of a discharged polymer which has had its molecular weight increased during the guide-wetting fall thereof is continuously recirculated to and fed through inlets 5 together with continuously fed fresh prepolymer 3, while continuously withdrawing the remainder of the discharged polymer from polymerizer 1 through outlet 10. The polymerizer is heated to and kept at an elevated temperature by means of a heater or a jacket (not shown). Among the cone-shaped guides 7B shown in FIG. 5, each of umbrella-shaped guides disposed at intermediate portions in the polymerizer can be fixed, for example, to a rod projecting from an inner wall of the polymerizer or to a wire hung from the upper inner wall of the polymerizer.

The use of this type polymerizer is commercially advantageous, since the production rate of aromatic polycarbonate (A) can be easily increased by increasing the surface area of cone-shaped guide 7B, so that a scale-up of the production can be easily performed.

Figure 6A:
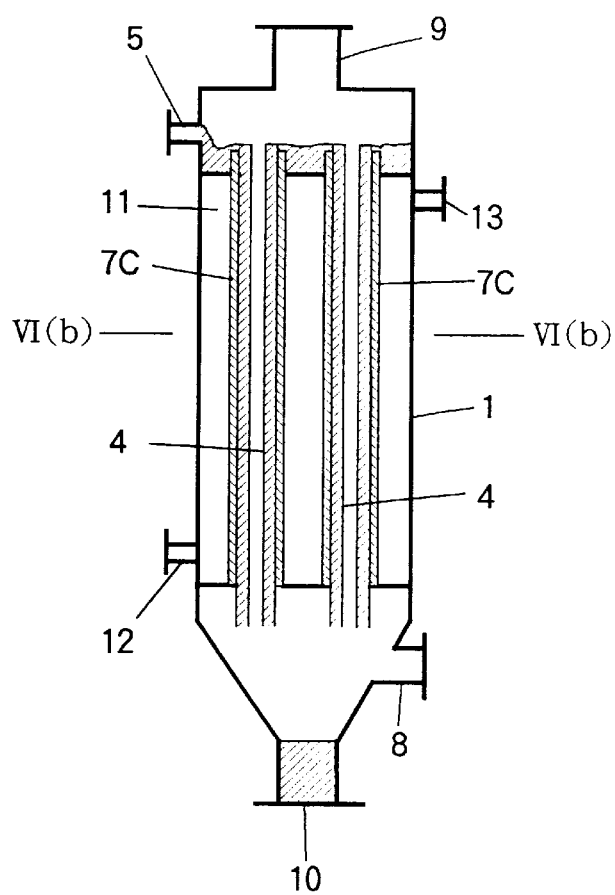
FIG. 6(a) is a diagrammatic cross-sectional view of a further form of polymerizer usable in the polymerization method for obtaining aromatic polycarbonate (A)
Figure 6B:
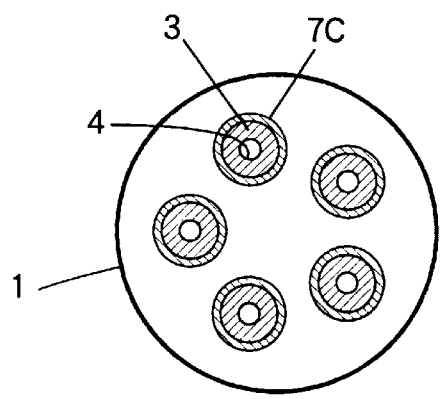
FIG. 6(b) is a diagrammatic cross-sectional view of the polymerizer of FIG. 6(a), taken along the line VI(b)—VI(b)

FIG. 6(a) and FIG. 6(b) show polymerizer 1 having a plurality of cylindrical tubular guides 7C each having an inner wall surface, along and in contact with which prepolymer 3 is to be allowed to fall. FIG. 6(a) is a diagrammatic vertical cross-sectional view of polymerizer 1. FIG. 6(b) is a diagrammatic cross-sectional view of the polymerizer of FIG. 6(a), taken along the line VI(b)—VI(b). In FIG. 6(a), prepolymer 3 is fed through inlet 5 to the polymerizer and accumulated at an upper portion of the interior of the polymerizer. Then, the accumulated prepolymer 3 is distributed, by overflowing, to the plurality of cylindrical tubular guides 7C which are fixed to upper and lower portions of the inner walls of shell-chamber 11. Prepolymer 3 is allowed to fall along and in contact with the inner wall of each cylindrical tubular guide 7C. A by-produced aromatic monohydroxy compound and the like are evaporated from evaporation surface 4 of prepolymer 3. The interior of polymerizer 1 is maintained at reduced pressure. Not only an aromatic monohydroxy compound as a by-product and the like, but also an inert gas, which is optionally fed from gas feed port 8, is discharged through vent 9. A polymer which has had its molecular weight increased during the guide-wetting fall thereof is discharged through outlet 10. It is requisite that the volume $V$ ($m^3$) and the evaporation surface area $S$ ($m^2$) of the liquid mass of the polymerizable material in the polymerizer, and the number average molecular weight $\overline{M}n$ of the polymer discharged from the polymerizer satisfy the relationship of the above-mentioned formula (I). The discharged polymer may be recirculated to inlet 5 and again allowed to fall along and in contact with cylindrical tubular guides 7C to further increase the molecular weight of the polymer. The polymerization may be performed in either a batchwise manner or a continuous manner. When the polymerization is performed in a batchwise manner, a polymer discharged from the polymerizer may be repeatedly recirculated to inlet 5. When the polymerization is performed in a continuous manner, it is possible that prepolymer 3 is continuously fed through inlet 5 and a polymer which has had its molecular weight increased during the guide-wetting fall thereof is continuously discharged through outlet 10. Alternatively, in the continuous manner practice, it is also possible that fresh prepolymer 3 is continuously fed through inlet 5, and a part of a discharged polymer which has had its molecular weight increased during the guide-wetting fall thereof is continuously recirculated to and fed through inlet 5 together with continuously fed fresh prepolymer 3, while continuously withdrawing the remainder of the discharged polymer from polymerizer 1 through outlet 10. Shell-chamber 11, which is a space surrounding the outer wall surface of each cylindrical tubular guide 7C, is heated by a heating medium. The heating medium is fed to shell-chamber 11 through inlet 12 for heating medium and discharged through outlet 13. As a heating medium, conventional heating mediums can be used. Examples of heating mediums include various heating mediums described at pages 109 to 110 of "Netsu-kokanki Handbook (Handbook of Heat-Exchangers)" (fifth edition, edited by the Editorial Committee of the Handbook of Heat Exchangers, and published by The Nikkan Kogyo Shimbun Ltd., Japan). Specific examples of heating mediums include heated steam, molten salt, SK-OIL#260, SK-OIL#240 and SK-OIL#170.

The use of this type polymerizer is commercially advantageous, since the production rate of an aromatic polycarbonate can be easily increased by increasing the number of cylindrical tubular guides 7C, so that a scale-up of the production can be easily performed.

In the present invention, it is preferred that the volume V of the liquid mass of polymerizable material is 5% or more, based on the internal volume of the polymerizer. When the volume V of the liquid mass of polymerizable material is less than 5%, based on the internal volume of the polymerizer, the size of the polymerizer needs to be large, which is commercially undesirable.

In the present invention, it is preferred that the evaporation surface area S ($m^2$) of the liquid mass of polymerizable material satisfies the following formula (II):

$$S \geq 0.03 \, Q \qquad (II)$$

wherein Q represents a rate (kg/hr) at which aromatic polycarbonate (A) is produced (hereinafter, frequently referred to simply as "production rate").

[It should be noted that formula (II) above is valid only when the unit of the evaporation surface area S is $m^2$ and the unit of the production rate Q is kg/hr.] When the evaporation surface area S does not satisfy formula (II), it is possible that when the production of the aromatic polycarbonate of the present invention is performed on a commercial scale, there arises, in the production of molten aromatic polycarbonate (A) in step (1), a need of effecting an extremely efficient surface renewal of the polymer being formed, wherein the polymer is caused to sustain a large shear, leading to a lowering of the quality of the final polymer, for example, occurrence of discoloration.

As mentioned above, the method used in the present invention is advantageous especially when the production of an aromatic polycarbonate composition is performed on a commercial scale. There is no particular limitation with respect to the production rate Q (kg/hr) of aromatic polycarbonate (A) in step (1) of the present invention. However, generally, it is preferred that the production rate Q (kg/hr) of aromatic polycarbonate (A) is 1 kg/hr or more, more preferably 3 kg/hr or more.

In the present invention, the polymerization temperature in step (1) is generally in the range of from 100 to 350° C., preferably from 150 to 290° C.

As the reaction proceeds, an aromatic monohydroxy compound is by-produced. By removing the aromatic monohydroxy compound from the reaction system, the reaction rate can be increased. Therefore, in the present invention, it is preferred to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The preferred reaction pressure may vary depending on the type of aromatic polycarbonate (A) to be produced, the molecular weight of the molten monomer mixture or molten prepolymer, and the polymerization temperature. For example, in the case of a reaction in which aromatic polycarbonate (A) is produced from bisphenol A and diphenyl carbonate, when the number average molecular weight of the molten monomer mixture or molten prepolymer is less than 1,000, the reaction pressure is preferably from 6,660 Pa (50 mmHg) to atmospheric pressure. When the number average molecular weight is from 1,000 to 2,000, the reaction pressure is preferably from 400 to 6,660 Pa (3 to 50 mmHg). When the number average molecular weight is greater than 2,000, the reaction pressure is preferably 2,670 Pa (20 mmHg) or less, more preferably 1,330 Pa (10 mmHg) or less, still more preferably 267 Pa (2 mmHg) or less.

It is particularly preferred that the polymerization is carried out under reduced pressure while introducing an inert gas as mentioned above.

The polymerization by the transesterification process may be carried out in the absence of a catalyst. However, when it is desired to accelerate the polymerization, the polymerization can be effected in the presence of a catalyst. The polymerization catalysts which are customarily used in the art can be used without particular limitations. Examples of such catalysts include hydroxides of alkali metals and of alkaline earth metals, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of alkali metals and of alkaline earth metals, such as lithium hydride, sodium hydride and calcium hydride; alkoxides of alkali metals and of alkaline earth metals, such as lithium methoxide, sodium ethoxide and calcium methoxide; aryloxides of alkali metals and of alkaline earth metals, such as lithium phenoxide, sodium phenoxide, magnesium phenoxide, LiO—Ar—OLi wherein Ar represents an aryl group, and NaO—Ar—ONa wherein Ar is as defined above; organic acid salts of alkali metals and of alkaline earth metals, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula:

(R$^1$ R$^2$ R$^3$ R$^4$)NB(R$^1$ R$^2$ R$^3$ R$^4$), and phosphonium borates represented by the formula:

(R$^1$ R$^2$ R$^3$ R$^4$)PB(R$^1$ R$^2$ R$^3$ R$^4$), wherein R$^1$, R$^2$, R$^3$ and R$^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts to be used is generally in the range of from $10^{-8}$ to 1% by weight, preferably from $10^{-7}$ to $10^{-1}$% by weight, based on the weight of the aromatic dihydroxy compound.

With respect to materials for constructing the polymerizers to be used in step (1) of the present invention, there is no particular limitation, but stainless steel, nickel or glass is generally used as a material for at least the inner wall portions of polymerizers.

With respect to materials for the guide used in the present invention, there is no particular limitation. However, preferred examples of materials for the guide include metals, glass and ceramics. Examples of metals include stainless steel, carbon steel, nickel, titanium, chromium and alloys, such as Hastelloy.

In step (2) of the method used in the present invention, thermoplastic resin (B) other than an aromatic polycarbonate is added to molten aromatic polycarbonate (A) obtained in step (1). In step (3), aromatic polycarbonate (A) and thermoplastic resin (B) are kneaded together. For performing each of the addition of thermoplastic resin (B) to aromatic polycarbonate (A) and the kneading of components (A) and (B), any of known techniques can be employed. The method used in the present invention is advantageous in that, in steps (2) and (3), aromatic polycarbonate (A) obtained in molten form in step (1) does not further experience high temperature conditions which would be inevitable if the obtained polycarbonate is subjected to a process in which cooling and heating for remelting is conducted. Therefore, by the method used in the present invention, the heat deterioration of the polycarbonate can be suppressed to a minimum level. Specific examples of methods for adding thermoplastic resin (B) to aromatic polycarbonate (A) in molten form include a method in which resin (B) is added at a point in a line connecting a final polymerizer to a kneader, a method in which resin (B) is added through a hopper of a kneader, and a method in which resin (B) is added through an inlet of a kneader. When thermoplastic resin (B) is added to aromatic polycarbonate (A), resin (B) may be in any of a powdery form, a pelletized form, a molten form and a solution form. If desired, molten aromatic polycarbonate (A) and thermoplastic resin (B) may be kneaded together with a thermal stabilizer, a phosphorus-containing flame retardant and/or the like.

Examples of methods for kneading aromatic polycarbonate (A) and thermoplastic resin (B) together include a kneading method using an in-line mixer, such as a polymer mixer; a kneading method using an extruder, such as a single-screw extruder, a twin-screw extruder and a multi-screw extruder; and a kneading method using a kneader or a kneading extruder. Of these methods, preferred is a kneading method using an extruder having a pair of shafts rotating in the same direction (i.e., a co-rotating twin-screw extruder). The use of the co-rotating twin-screw extruder is advantageous not only in that such an extruder has an excellent self-cleaning ability, but also in that, when an additive, such as a thermal stabilizer and/or a phosphorus-containing flame retardant, is used, both good dispersion of the additive in the resin composition and high extrusion rate can be achieved. More preferred is a kneading method using the co-rotating twin-screw extruder having two or more inlets, and still more preferred is a kneading method using a co-rotating twin-screw extruder having two or more inlets and one or more vents.

As a specific preferred example of methods for kneading aromatic polycarbonate (A) and thermoplastic resin (B) together, there can be mentioned a method in which the addition of thermoplastic resin (B) to aromatic polycarbonate (A) in step (2) and the kneading thereof in step (3) are conducted using an extruder having a first inlet and a second inlet, wherein the second inlet is disposed downstream of the first inlet as viewed in an extrusion direction of the extruder, and wherein aromatic polycarbonate (A) and thermoplastic resin (B) are fed to the extruder through the first inlet and the second inlet, respectively, and kneaded together in the extruder. In this kneading method, with respect to the size (such as the length and the inner diameter) of the extruder used and the positional relationship between the first inlet and the second inlet, there is no particular limitation. However, when thermoplastic resin (B) fed to the extruder through the second inlet is in non-molten form (such as a pelletized, a particulate or a powdery form), it is preferred that the size of the extruder and the positional relationship between the first inlet and the second inlet are such that thermoplastic resin (B) can be melt-kneaded together with aromatic polycarbonate (A) in the extruder. On the other hand, when thermoplastic resin (B) fed to the extruder through the second inlet is in molten form, the distance between the second inlet and the outlet of the extruder and the length of the extruder may be small, as compared to those in the case of the extruder suitably used when thermoplastic resin (B) fed to the extruder is in non-molten form. However, in either of the above two cases, it is generally preferred that the distance between the first inlet and the second inlet is from 1D to 10D (wherein D represents the diameter of the screw of the extruder), more advantageously from 2D to 6D. The distance between the second inlet and the outlet is generally from 5D to 50D, preferably from 10D to 25D. It is preferred that the entire length of the extruder is from 15D to 30D.

With respect to the method for feeding molten aromatic polycarbonate (A) obtained in step (1) through the first inlet of the extruder, there is no particular limitation. In general, by free fall or by using a gear pump or the like, molten aromatic carbonate (A) is fed to the extruder through the first inlet (e.g., a hopper opening). For achieving a high extrusion rate, it is preferred that, by using a gear pump which is provided at an intermediate portion of a feed line arranged between the outlet of a final polymerizer {for producing aromatic polycarbonate (A)} and the first inlet of the extruder, wherein the gear pump is secured to the feed line by means of a flange or the like, the feeding of molten aromatic polycarbonate (A) through the first inlet is conducted under a pressure of from 1 to 100 kg/cm$^2$ which is exerted by means of the gear pump.

In the present invention, with respect to the method for feeding thermoplastic resin (B) to the extruder through the second inlet, there is no particular limitation, and any conventional methods may be used. In the present invention, generally, thermoplastic resin (B) may be fed to the extruder through a feeder or a preliminary extruder.

When thermoplastic resin (B) is fed through a feeder, any conventional feeders may be used. Examples of feeders include a gravimetric feeder and a volumetric feeder. Each of the gravimetric feeder and the volumetric feeder is individually connected to the second inlet of the extruder directly or through another feeder {corresponding to side feeder (side arm) 21 shown in each of FIGS. 8 and 9}. That is, for feeding thermoplastic resin (B) in non-molten form through the second inlet, for example, thermoplastic resin (B) in non-molten form may be directly fed from a gravimetric feeder or a volumetric feeder; or alternatively, thermoplastic resin (B) may first be fed to a gravimetric feeder or a volumetric feeder for the measurement of the quantity of thermoplastic resin (B), and then fed to another feeder (corresponding to side feeder 21 shown in each of FIGS. 8 and 9) connected to the second inlet of the extruder.

When thermoplastic resin (B) is fed through a preliminary extruder, thermoplastic resin (B) in non-molten form is fed to the preliminary extruder connected to the second inlet of a main extruder {for kneading aromatic polycarbonate (A) and thermoplastic resin (B) together} so that thermoplastic resin (B) can be melted before reaching the second inlet of the main extruder, and then thermoplastic resin (B) in molten form is fed to the second inlet of the main extruder.

It is preferred that the feeding of thermoplastic resin (B) to the extruder through the second inlet is conducted by a method in which thermoplastic resin (B) in non-molten form is fed to the second inlet, since thermoplastic resin (B) does not further experience high temperature conditions before the entry thereof into the extruder. It is especially preferred that the feeding of thermoplastic resin (B) to the extruder through the second inlet is conducted by a method in which thermoplastic resin (B) in non-molten form is first fed to a gravimetric feeder or a volumetric feeder for the measurement of the quantity of thermoplastic resin (B), and then fed to another feeder (corresponding to side feeder 21 shown in each of FIGS. 8 and 9) connected to the second inlet of the extruder.

In step (2) of the method used in the present invention, it is preferred that aromatic polycarbonate (A) and thermoplastic resin (B) are kneaded together with a thermal stabilizer and, if desired, a phosphorous-containing flame retardant. (As described below, the additives usable in the present invention are not limited to the thermal stabilizer and the phosphorus-containing flame retardant.) With respect to the method for feeding the above-mentioned additives (i.e., the thermal stabilizer and the phosphorous-containing flame retardant), there is no particular limitation. For example, the additive may be fed to the extruder together with thermoplastic resin (B). Alternatively, when the extruder has three or more inlets {that is, when the extruder has one or more additional inlets which are other than the first and second inlets for feeding aromatic polycarbonate (A) and thermoplastic resin (B), respectively}, the additive may be fed to the extruder through the additional inlet or inlets separately from thermoplastic resin (B). For feeding the additive together with thermoplastic resin (B) through the second inlet to the extruder, for example, the additive may be fed to the extruder through the second inlet in the form of a homogeneous mixture thereof with thermoplastic resin (B), wherein the homogeneous mixture can be prepared by using a mixer, such as a Henschel mixer, a super mixer, a tumbling mixer and a ribbon mixer; or alternatively, the additive may first be fed to a dosing feeder for the measurement of the quantity of the additive, and then fed together with thermoplastic resin (B) to the extruder through the second inlet. Further, for feeding the additive separately from thermoplastic resin (B), as mentioned above, an extruder having one or more additional inlets which are other than the first and second inlets is used, wherein the additive is fed to the extruder through the additional inlet or inlets separately from thermoplastic resin (B).

In the present invention, the kneading temperature varies depending on the type of thermoplastic resin (B). However, generally, the kneading temperature is from 200 to 380° C. With respect to thermoplastic resin (B) used in the present invention, there is no particular limitation as long as it can be mixed with an aromatic polycarbonate. Examples of thermoplastic resins (B) include aromatic vinyl resins, such as polystyrene, poly-α-methylstyrene, a styrene-maleic anhydride copolymer, a styrene-acrylonitrile copolymer and a styrene-methyl methacrylate copolymer; rubber-reinforced thermoplastic resins, such as a styrene-butadiene-acrylonitrile copolymer (ABS resin), an acrylate-styrene-acrylonitrile copolymer (AAS resin), an EPDM-styrene-acrylonitrile copolymer (AES resin) (wherein EPDM is an ethylene-propylene-diene terpolymer) and a HIPS (high impact polystyrene); polyqlefin resins, such as polyethylene, polypropylene, polybutene, poly(methylpentene), an ethylene-propylene copolymer and an ethylene-propylene-diene copolymer; polyester resins, such as polyethylene terephthalate, polybutylene terephthalate, polyarylate and p-oxybenzoyl polyester; polyamide resins, such as nylon 6, nylon 66, nylon 610, nylon 11 and nylon 12; acrylic resins, such as polymethyl methacrylate; diene rubbers, such as polybutadiene and polyisoprene; polyether resins, such as a polyphenylene sulfide, a polyphenylene ether, a polyoxymethylene, a polysulfone, a polyether sulfone and a polyether ketone; and thermoplastic polyurethanes. Among these thermoplastic resins, preferred are rubber-reinforced thermoplastic resins (such an ABS resin), polyethylene terephthalate, polybutylene terephthalate, polypropylene, a styrene-acrylonitrile copolymer and polybutadiene. The ABS resin is especially preferred.

Hereinbelow, description is made with respect to a rubber-reinforced thermoplastic resin which can be preferably used as thermoplastic resin (B) in the present invention.

A rubber-reinforced thermoplastic resin which can be preferably used as thermoplastic resin (B) in the present invention is a rubber-reinforced thermoplastic resin which comprises 10 to 100 parts by weight of a rubber graft copolymer obtained by a method comprising grafting on a rubber polymer at least one vinyl compound graft-copolymerizable with the rubber polymer, and 90 to 0 parts by weight of at least one vinyl polymer, and wherein the total amount of the rubber graft copolymer and the at least one vinyl polymer is 100 parts by weight.

The vinyl polymer, which is optionally contained in the above-mentioned rubber-reinforced thermoplastic resin, may be one which is formed simultaneously with the above-mentioned grafting. Specifically, in this case, the vinyl polymer may be obtained by the non-graft polymerization of the above-mentioned at least one vinyl compound used for obtaining the rubber graft copolymer or at least one vinyl compound other than the above-mentioned at least one vinyl compound used for obtaining the rubber graft copolymer. Alternatively, the optionally contained vinyl polymer may be a vinyl polymer which has been produced separately from the rubber graft copolymer. When the rubber-reinforced thermoplastic resin is in the form of a resin composition comprising the rubber graft copolymer and the vinyl polymer, the resin composition as such can be directly added to molten aromatic polycarbonate (A). Also, such a resin composition as the rubber-reinforced thermoplastic resin may be subjected to melt-kneading before adding the rubber-reinforced thermoplastic resin to molten aromatic polycarbonate (A). However, since a melt-kneading of the rubber-reinforced thermoplastic resin disadvantageously increases the thermal history of the rubber component thereof, it is preferred that the rubber-reinforced thermoplastic resin as such is added to molten aromatic polycarbonate (A).

Examples of rubber polymers usable for producing the rubber-reinforced thermoplastic resin include conjugated diene rubbers, such as polybutadiene, polyisoprene, polychloroprene, a butadiene-styrene copolymer and a butadiene-acrylonitrile copolymer; an ethylene-propylene rubber; and acrylic rubbers, such as an ethyl acrylate polymer and a butyl acrylate polymer. Among these rubber polymers, polybutadiene, a butadiene-styrene copolymer and a butadiene-acrylonitrile copolymer, each of which is a conjugated diene rubber, are preferred. These rubber polymers can be used individually or in combination.

The content of the rubber polymer in the rubber-reinforced thermoplastic resin is generally from 3 to 80% by weight, preferably, 5 to 50% by weight. When the rubber polymer content of the rubber-reinforced thermoplastic resin is less than 3% by weight, the impact resistance of the polycarbonate composition containing such a rubber-reinforced thermoplastic resin is likely to become unsatisfactory. On the other hand, when the rubber polymer content of the rubber-reinforced thermoplastic resin is more than 80% by weight, the polycarbonate composition containing such a rubber-reinforced thermoplastic resin is likely to have disadvantages such that not only is the melt fluidity of the composition in molding poor, but also a molded article produced from the composition has poor luster.

With respect to the particle diameter of the rubber polymer in the rubber-reinforced thermoplastic resin, there is no particular limitation. The preferred particle diameter of the rubber polymer varies depending on the type of the vinyl polymer, which constitutes the "sea" moiety of the rubber-reinforced thermoplastic resin having a "islands/sea" structure. For example, when the rubber-reinforced thermoplastic resin is an ABS resin, the particle diameter of the rubber polymer is preferably from 0.15 to 0.6 μm, more preferably from 0.2 to 0.5 μm, still more preferably from 0.25 to 0.45 μm, is measured before graft copolymerization of a vinyl compound. When the particle diameter of the rubber polymer is less than 0.15 μm, the impact strength of the polycarbonate composition containing such a rubber-reinforced thermoplastic resin is likely to become unsatisfactory. On the other hand, when the particle diameter of the rubber polymer is more than 0.6 μm, the luster of a molded article obtained from the polycarbonate composition containing such a rubber-reinforced thermoplastic resin is likely to become poor.

Examples of vinyl compounds which are graft-copolymerizable with a rubber polymer particle used in the present invention include aromatic vinyl compounds, such as styrene and α-methylstyrene p-methylstyrene; alkyl (meth)acrylates, such as methyl methacrylate, methyl acrylate, butyl acrylate and ethyl acrylate; (meth)acrylic acids, such as acrylic acid and methacrylic acid; vinyl cyanide compounds, such as acrylonitrile and methacrylonitrile; α,β-unsaturated carboxylic acids and anhydrides thereof, such as maleic acid and maleic anhydride; maleimide compounds, such as N-phenylmaleimide, N-methylmaleimide and N-cyclohexylmaleimide; and glycidyl group-containing compounds, such as glycidyl methacrylate. Among these vinyl compounds, preferred are aromatic vinyl compounds, alkyl (meth)acrylates, vinyl cyanide compounds and maleimide compounds. More preferred are styrene, acrylonitrile, N-phenylmaleimide and butyl acrylate. These vinyl compounds can be used individually or in combination.

Examples of vinyl polymers which can be contained in the rubber-reinforced thermoplastic resin include polymers of aromatic vinyl compounds, such as styrene, α-methylstyrene and p-methylstyrene; polymers of alkyl (meth)acrylates, such as methyl methacrylate, methyl acrylate, butyl acrylate and ethyl acrylate; polymers of (meth)acrylic acids, such as acrylic acid and methacrylic acid; polymers of vinyl cyanide compounds, such as acrylonitrile and methacrylonitrile; polymers of anhydrides of α,β-unsaturated carboxylic acids, such as maleic anhydride; polymers of maleimide compounds, such as N-phenylmaleimide, N-methylmaleimide and N-cyclohexylmaleimide; polymers of glycidyl group-containing compounds, such as glycidyl methacrylate; and copolymers of the above-mentioned vinyl compounds. Among these vinyl polymers, preferred are a polymer of an aromatic vinyl compound, a polymer of an alkyl (meth) acrylate, a polymer of a vinyl cyanide compound, a polymer of a maleimide compound, and copolymers of the above-mentioned vinyl compounds. More preferred are a polymer of styrene, a polymer of acrylonitrile, a polymer of N-phenylmaleimide, a polymer of butyl acrylate, and copolymers of the above-mentioned vinyl compounds. These polymers and copolymers of vinyl compounds can be used individually or in combination.

With respect to the method for producing the rubber-reinforced thermoplastic resin, there is no particular limitation, and the rubber-reinforced thermoplastic resin can be produced by a conventional method.

It is preferred that the rubber-reinforced thermoplastic resin used in the present invention has an ash content of 0.1% by weight or less, more advantageously 0.08% by weight or less. When the ash content of the rubber-reinforced thermoplastic resin is more than 0.1% by weight, the molecular weight of the aromatic polycarbonate of the aromatic polycarbonate composition is likely to lower during the production of the aromatic polycarbonate composition or upon molding of the aromatic polycarbonate composition, so that the aromatic polycarbonate composition has poor impact resistance, or a molded article produced from the aromatic polycarbonate composition disadvantageously has silver streaks on its surface.

As mentioned above, when a rubber-reinforced thermoplastic resin is used as thermoplastic resin (B) in the production of the aromatic polycarbonate composition by using an extruder having a first inlet and a second inlet, it is preferred that the rubber-reinforced thermoplastic resin is fed to the second inlet of the extruder in non-molten form and the kneading is conducted at a temperature of 280° C. or less, thereby avoiding an unnecessary but rather detrimental increase in the thermal history of the rubber-reinforced thermoplastic resin. When the kneading is conducted at a temperature of more than 280° C., the rubber component of the rubber-reinforced thermoplastic resin is likely to be deteriorated or coagulated, so that the mechanical properties of the obtained aromatic polycarbonate composition tend to lower.

In the present invention, the weight ratio of thermoplastic resin (B) to aromatic polycarbonate (A) is preferably in the range of from 1:99 to 99:1, more preferably from 10:90 to 90:10, still more preferably from 10:90 to 50:50.

With respect to the thermal stabilizers used in the present invention, there is no particular limitation, and any thermal stabilizers conventionally used for aromatic polycarbonates can be used. For example, a phosphorus-containing stabilizer, a phenolic stabilizer, a sulfur-containing stabilizer, an epoxy-containing stabilizer and a hindered amine stabilizer can be used in the present invention.

Examples of phosphorus-containing stabilizers include phosphorus-containing acids, phosphorous esters, phosphinic esters, phosphoric esters and phosphonic esters. Representative examples of phosphorus-containing acids include phosphoric acid, phosphorous acid, hypophosphorous acid, pyrophosphoric acid, polyphosphoric acid, phosphinic acids represented by the following formula (III):

and phosphonic acids represented by the following formula (IV):

wherein $R^{11}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-tert-butylphenyl group, a 2,4-di-tert-butylphenyl group, a 2,6-di-tert-butylphenyl group, a p-nonylphenyl group and a dinonylphenyl group.

More specific examples of phosphonic acids represented by the formula (IV) include phenylphosphonic acid. These compounds can be used individually or in combination.

Examples of phosphorous esters include a phosphorous triester, a phosphorous diester and a phosphorous monoester, which are, represented by the following formulae (V) to (VIII):

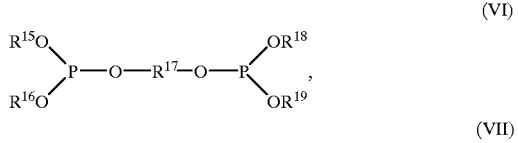

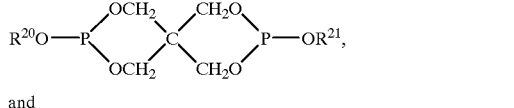

and

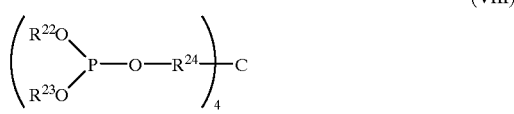

wherein each of $R^{12}$, $R^{13}$, $R^{14}$, $R^{15}$, $R^{16}$, $R^{18}$, $R^{19}$, $R^{20}$, $R^{21}$, $R^{22}$ and $R^{23}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-tert-butylphenyl group, a 2,4-di-tert-butylphenyl group, a 2,6-di-tert-butylphenyl group, a p-nonylphenyl group and a dinonylphenyl group; and each of $R^{17}$ and $R^{24}$ independently represents alkylene, arylene or arylalkylene.

Specific examples of phosphorous triesters include tris(2,4-di-tert-butylphenyl) phosphite, tris(nonylphenyl) phosphite, tris(dinonylphenyl) phosphite, triphenyl phosphite, tetraphenyl dipropylene glycol diphosphite, tetra (tridecyl) 4,4'-isopropylidene diphenyl diphosphite, bis (tridecyl) pentaerythritol diphosphite, bis(nonylphenyl) pentaerythritol diphosphite, bis(2,4-di-tert-butylphenyl) pentaerythritol diphosphite, bis(2,6-di-tert-butyl-4-methylphenyl) pentaerythritol diphosphite, distearyl pentaerythritol diphosphite, a hydrogenated bisphenol A/pentaerythritol phosphite polymer and tetraphenyltetra (tridecyl)pentaerythritol tetraphosphite. Among these compounds, phosphorous triesters having a 2,4-di-tert-butylphenyl group or a 2,6-di-tert-butylphenyl group are especially preferred, since such compounds improves the hydrolysis resistance of an aromatic polycarbonate, and specific examples of such especially preferred phosphorous triesters include tris(2,4-di-tert-butylphenyl) phosphite, bis (2,4-di-tert-butylphenyl) pentaerythritol diphosphite and bis (2,6-di-tert-butyl-4-methylphenyl) pentaerythritol diphosphite.

Preferred examples of phosphorous diesters include aromatic phosphorous diesters. Examples of aromatic phosphorous diesters include diphenyl hydrogen phosphite, bis (nonylphenyl) hydrogen phosphite, bis(2,4-di-tert-butylphenyl) hydrogen phosphite, dicresyl hydrogen phosphite, bis(p-tert-butylphenyl) hydrogen phosphite and bis(p-hexylphenyl) hydrogen phosphite.

Specific examples of phosphorous monoesters include phenyl dihydrogen phosphite, nonylphenyl dihydrogen phosphite and 2,4-di-tert-butylphenyl dihydrogen phosphite.

The above-mentioned compounds can be used individually or in combination.

Examples of phosphinic esters include phosphinic monoesters and phosphinic diesters, which are represented by the following formulae (IX) and (X):

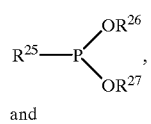

(IX)

and

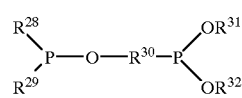

(X)

wherein $R^{25}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-tert-butylphenyl group, a 2,4-di-tert-butylphenyl group, a 2,6-di-tert-butylphenyl group, a p-nonylphenyl group and a dinonylphenyl group; and each of $R^{26}$, $R^{27}$, $R^{28}$, $R^{29}$, $R^{31}$ and $R^{32}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-tert-butylphenyl group, a 2,4-di-tert-butylphenyl group, a 2,6-di-tert-butylphenyl group, a p-nonylphenyl group and a dinonylphenyl group; and $R^{30}$ represents an alkylene group, an arylene group or an arylalkylene group.

A representative example of these compounds is tetrakis (2,4-di-tert-butylphenyl) 4,4'-biphenylene diphosphinate.

The above-mentioned compounds can be used individually or in combination.

Examples of phosphoric esters include a phosphoric diester and a phosphoric monoester, which are represented by the following formulae (XI) to (XIV):

(XI)

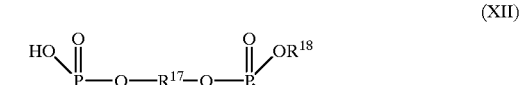

(XII)

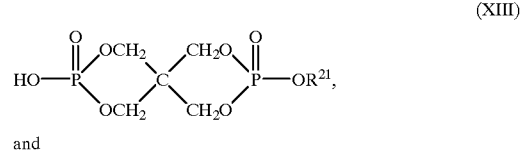

(XIII)

and

(XIV)

wherein $R^{13}$, $R^{14}$, $R^{16}$, $R^{17}$, $R^{18}$, $R^{19}$, $R^{21}$, $R^{23}$ and $R^{24}$ are as defined above.

Specific examples of phosphoric diesters include diphenyl hydrogen phosphate, bis(nonylphenyl) hydrogen phosphate, bis(2,4-di-tert-butylphenyl) hydrogen phosphate, dicresyl hydrogen phosphate, bis(p-tert-butylphenyl) hydrogen phosphate and bis(p-hexylphenyl) hydrogen phosphate.

Specific examples of phosphoric monoesters include phenyl dihydrogen phosphate, nonylphenyl dihydrogen phosphate and 2,4-di-tert-butylphenyl dihydrogen phosphate.

The above-mentioned compounds can be used individually or in combination.

Examples of phosphonic esters include compounds represented by the following formulae (XV) and (XVI):

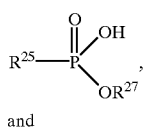

and

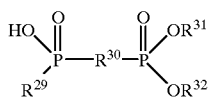

wherein $R^{25}$, $R^{27}$, $R^{29}$, $R^{30}$, $R^{31}$ and $R^{32}$ are as defined above.

Examples of phenolic stabilizers include compounds represented by the following formula (XVII):

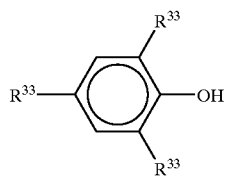

wherein each of $R^{33}$'s independently represents a hydrogen atom, a hydroxyl group, a $C_1$–$C_{10}$ alkoxyl group, or an unsubstituted or substituted $C_1$–$C_{10}$ hydrocarbon group, with the proviso that at least one of $R^{33}$'s represents an unsubstituted or substituted hydrocarbon group.

Specific examples of the above-mentioned phenolic stabilizers include 2,6-di-tert-butyl-p-cresol, 2,6-di-tert-butyl-p-anisole, 2,6-di-tert-butyl-4-ethylphenol, 2,2'-methylene bis(6-tert-butyl-p-cresol), 2,2'-methylene bis(4-ethyl-6-tert-butyl-p-phenol), 4,4'-methylene bis(6-tert-butyl-p-cresol), 4,4'-butylidene bis(6-tert-butyl-m-cresol), tetrakis [methylene-3-(3',5'-di-tert-butyl-4'-hydroxyphenyl)propionate]methane, 4,4'-thio bis(6-tert-butyl-m-cresol), stearyl-β-(3,5-di-tert-buty-4-hydroxyphenyl) propionate, 1,3,5-trimethyl-2,4,6-tris(3,5-di-tert-butyl-4-hydroxybenzyl)berizene, 1,1,3-tris(2-methyl-4-hydroxy-5-tert-butylphenyl)butane and triethylene glycol-bis[3-(3-tert-butyl-5-methyl-4-hydroxyphenyl) propionate].

Preferred examples of phenolic stabilizers include compounds represented by the following formula (XVIII):

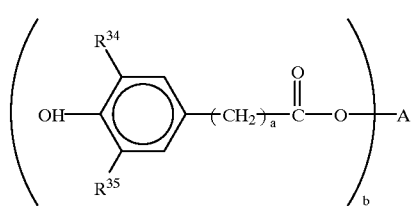

wherein $R^{34}$ represents a methyl group or a t-butyl group, $R^{35}$ represents a t-butyl group, A represents a $C_1$–$C_{30}$ hydrocarbon group or a $C_1$–$C_{30}$ heterocyclic group having a valence of b, a represents an integer of from 1 to 4 and b represent an integer of 1 or more.

Specific examples of the above-mentioned phenolic stabilizers include tetrakis[methylene-3-(3',5'-di-tert-butyl-4'-hydroxyphenyl) propionate]methane, stearyl-β-(3,5-di-tert-butyl-4-hydroxyphenyl) propionate and triethylene glycol-bis[3-(3-tert-butyl-5-methyl-4-hydroxyphenyl) propionate].

Further examples of phenolic stabilizers include a phenolic stabilizer containing a phosphorus atom, such as diethyl (3,5-di-tert-butyl-4-hydroxybenzyl)phosphonate and calcium bis[ethyl (3,5-di-tert-butyl-4-hydroxybenzyl) phosphonate].

The above-mentioned phenolic stabilizers can be used individually or in combination.

Examples of sulfur-containing stabilizers include a sulfinic acid represented by the formula $R^{36}$—$SO_2$—$R^{37}$, a sulfonic acid represented by the formula $R^{36}$—$SO_3$—$R^{37}$, (in each of these formulae, $R^{36}$ is equivalent to $R^{11}$ and $R^{37}$ is equivalent to $R^{12}$), esters thereof, and thioether compounds represented by the following formula (XIX):

wherein each of $R^{38}$ and $R^{39}$ independently represents a $C_{12}$–$C_{18}$ alkyl group.

Specific examples of the above-mentioned sulfur-containing stabilizers include benzenesulfinic acid, p-toluenesulfinic acid, benzenesulfonic acid, p-toluenesulfonic acid, naphthalenesulfonic acid, and a methyl-, an ethyl-, a butyl-, an octyl- and a phenylester thereof. Further examples include dilauryl-3,3'-thiodipropionate, ditridecyl-3,3'-thiodipropionate, dimyristyl-3,3'-thiodipropionate, distearyl-3,3'-thiodipropionate and pentaerythritol(β-laurylthiopropinate). These sulfur-containing stabilizers can be used individually or in combination.

Examples of epoxy-containing stabilizers include epoxy-containing fats and oils, such as epoxidated soybean oil and epoxidated linseed oil; glycidyl compounds, such as phenylglycidyl ether, allylglycidyl ether, t-butylphenylglycidyl ether, bisphenol A diglycidyl ether, tetrabromo bisphenol A diglycidyl ether, digly.pacidyl phthalate, diglycidyl hexahydrophthalate; epoxycyclohexane compounds, such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisepoxycyclohexyl adipate, octadecyl-2,2'-dimethyl-3,4-epoxycyclohexane carboxylate, n-butyl-2,2'-dimethyl-3,4-epoxycyclohexane carboxylate, cyclohexyl-2-methyl-3,4-epoxycyclohexane carboxylate, n-butyl-2-isopropyl-3,4-epoxy-5-methylcyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-tert-butyl-4,5-epoxy-cis-1,2-cyclohexane carboxylate, 3,4-dimethyl-1,2-epoxycyclohexane, 3,5-dimethyl-1,2-epoxycyclohexane and 3-methyl-5-tert-butyl-1,2-epoxycyclohexane; bisepoxydicyclopentadienyl ether; butadiene diepoxide; tetraphenylethylene epoxide; epoxidated polybutadiene; 4,5-epoxytetrahydrophthalic anhydride; and 3-tert-butyl-4,5-epoxytetrahydrophthalic anhydride. These epoxy stabilizers can be used individually or in combination.

Examples of hindered amine stabilizers include bis(2,2,6,6-tetramethyl-4-piperidyl)sebacate, bis(1,2,6,6-pentamethyl-4-piperidyl)sebacate, bis(1,2,2,6,6-pentamethyl-4-piperidyl) 2-(3,5-di-tert-butyl-4-hydroxybenzyl)-2-n-butylmalonate, tetrakis(2,2,6,6-tetramethyl-4-piperidyl) 1,2,3,4-butanetetracarboxylate, 1-[2-{3-(3,5-di-tert-butyl-4-hydroxyphenyl)propionyloxy}ethyl]-4-{3-(3,5-di-tert-butyl-4-hydroxyphenyl)propionyloxy}-2,2,6,6-tetramethylpiperidine, 8-benzyl-7,7,9,9-tetramethyl-3-octyl-1,2,3-triazaspiro{4,5}undecane-2,4-dione and 4-benzoyloxy-2,2,6,6-tetramethylpiperidine. These hindered amine stabilizers can be used individually or in combination.

The above-mentioned thermal stabilizers may be used individually or in combination. Among the above-mentioned thermal stabilizers, a phosphorus-containing stabilizer having an active hydrogen atom, a sulfur-containing stabilizer having an active hydrogen atom, a sulfinic ester and a sulfonic ester are preferred. Examples of phosphorus-containing stabilizers having an active hydrogen atom include a phosphoric acid, a phosphinic acid, a phosphonic acid, a phosphorous diester, a phosphorous monoester, a phosphinic monoester, a phosphoric diester, a phosphoric monoester and a phosphonic monoester, which are mentioned above. Examples of sulfur-containing stabilizers having an active hydrogen atom include a sulfinic acid and a sulfonic acid. Among them, a phosphorus-containing stabilizer having an active hydrogen atom, especially a phosphorous monoester and a phosphorous diester are preferred. The amount of the thermal stabilizer is not specifically limited; however, the thermal stabilizer is generally used in an amount of from 0.0005 to 0.50 part by weight, relative to 100 parts by weight of the total of aromatic polycarbonate (A) and thermoplastic resin (B). With respect to a thermal stabilizer having an active hydrogen atom, it is preferred to use the thermal stabilizer in an amount of from 0.0005 to 0.015 part by weight, more preferably from 0.0005 to 0.009 part by weight, relative to 100 parts by weight of aromatic polycarbonate (A).

When the above-mentioned thermal stabilizers are used in combination, the combination of the thermal stabilizers is not specifically limited. However, preferred is a combination of at least one stabilizer selected from the group consisting of the phosphorus-containing stabilizers having an active hydrogen atom, the sulfur-containing stabilizers having an active hydrogen atom, the sulfinic esters and the sulfonic esters with at least one stabilizer selected from the group consisting of the above-mentioned phosphorus-containing stabilizers other than the phosphorus-containing stabilizer having an active hydrogen atom; the phenolic stabilizers, the above-mentioned sulfur-containing stabilizers other than the sulfur-containing stabilizer having an active hydrogen atom, the sulfinic ester and the sulfonic ester; the above-mentioned epoxy-containing stabilizers and the above-mentioned hindered amine stabilizers. Among them, preferred is a combination of at least one stabilizer selected from the group consisting of the phosphorus-containing stabilizers having an active hydrogen atom, the sulfur-containing stabilizers having an active hydrogen atom, the sulfinic esters and the sulfonic esters with at least one stabilizer selected from the group consisting of the phosphorous triesters, the phosphinic diesters and the phenolic stabilizers. Especially preferred is a combination of at least one stabilizer selected from the group consisting of the phosphorous diesters and the phosphorous monoesters with at least one stabilizer selected from the group consisting of the phosphorous triesters, the phosphinic diesters and the phenolic stabilizers. The use of the different stabilizers in combination as mentioned above is advantageous for suppressing the occurrence of the discoloration of a recycled aromatic polycarbonate composition at the time of molding thereof and for preventing the occurrence of the thermal aging of the aromatic polycarbonate resin composition for a prolonged period of time.

When different stabilizers are used in combination as mentioned above, the respective amounts of combined first and second thermal stabilizers are not specifically limited; however, the first thermal stabilizer selected from the group consisting of the phosphorus-containing stabilizers having an active hydrogen atom, the sulfur-containing stabilizers having an active hydrogen atom, the sulfinic esters and the sulfonic esters is generally used in an amount of from 0.0005 to 0.015 part by weight, preferably from 0.0005 to 0.009 part by weight, relative to 100 parts by weight of aromatic polycarbonate (A), and the second stabilizer used in combination with the first thermal stabilizer is generally used in an amount of from 0.0005 to 0.05 part by weight, preferably from 0.0005 to 0.3 part by weight, more preferably from 0.001 to 0.1 part by weight, relative to 100 parts by weight of the total of aromatic polycarbonate (A) and thermoplastic resin (B).

There is no particular limitation to the phosphorous-containing flame retardants used in the present invention. Examples of phosphorous-containing flame retardants include phosphates containing no halogen, such as trimethyl phosphate, triethyl phosphate, tributyl phosphate, trioctyl phosphate, tributoxyethyl phosphate, triphenyl phosphate, tricresyl phosphate and octyldiphenyl phosphate; halogen-containing phosphates, such as tris(chloroethyl) phosphate, bis(2,3-dibromopropyl)2,3-dichloropropyl phosphate, tris (dichloropropyl) phosphate and bis(chloropropyl)monooctyl phosphate; and oligomeric phosphates represented by the following formula (XX):

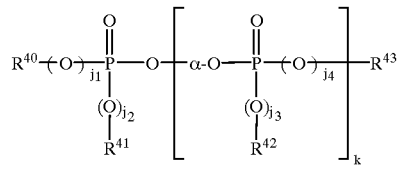

wherein each of $R^{40}$, $R^{41}$, $R^{42}$ and $R^{43}$ independently represents an alkyl group or an aryl group, such as a phenyl group, a cresyl group, a xylenyl group, a propylphenyl group, an aryl group, an alkylaryl group or halogenated derivatives thereof; a represents an arylene group derived from a dihydroxy compound, such as resorcin, hydroquinone, bisphenol A or halogenated derivatives thereof; each of j1, j2, j3 and j4 individually represents an integer of 0 or 1; and k represents an integer of from 1 to 30.

Among the above-mentioned phosphate-containing flame retardants, preferred is tricresyl phosphate and oligomeric phosphates represented by the following formula (XXI) to (XXIV):

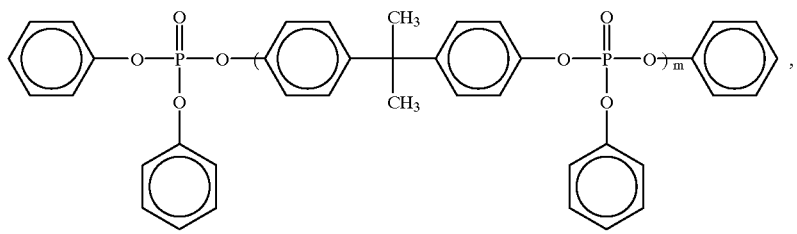

(XXI)

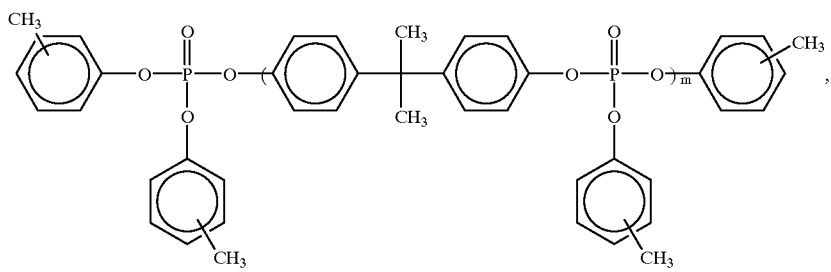

(XXII)

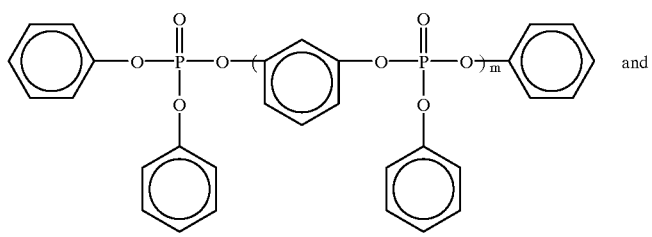

and (XXIII)

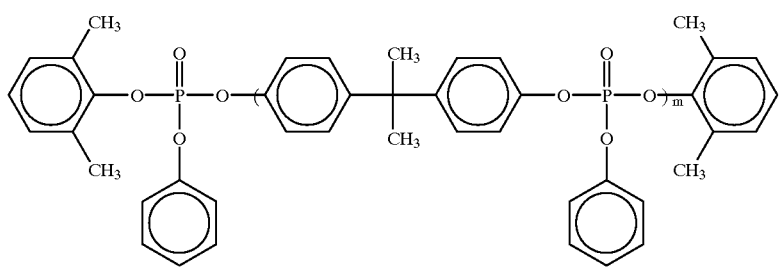

(XXIV)

wherein m is equivalent to k defined for formula (XX).

The oligomeric phosphates mentioned above may comprise a plurality of oligomer chains having the same degrees of polymerization or may comprise a plurality of oligomer chains having different degrees of polymerization. In the case of the latter, m represents the average degree of polymerization, and preferably, m is an integer of from 1 to 10, and more preferably of from 1 to 5.

In the present invention, it is preferred that the phosphorous-containing flame retardant is used in an amount within the range of from 1 to 25 parts by weight, more preferably from 5 to 20 parts by weight, relative to 100 parts by weight of the total of aromatic polycarbonate (A) and thermoplastic resin (B).

The aromatic polycarbonate composition of the present invention may comprise additives other than mentioned above. Examples of other additives include a mold release agent, a weatherability agent, a coloring agent, a flame retardant other than the phosphorous-containing flame retardant, a filler, an antioxidant and an anti-dripping agent. These additives may be fed to the extruder in substantially the same manner as mentioned above in connection with the thermal stabilizer and the phosphorous-containing flame retardant. The aromatic polycarbonate composition of the present invention may also be pelletized, and melt-kneaded, if desired, together with an additive, to obtain a desired shaped product.

BEST MODE FOR CARRYING OUT THE INVENTION

Hereinbelow, the present invention will be described in more detail with reference to the following Examples and Comparative Examples, but the Examples should not be construed as limiting the scope of the present invention.

In the following Examples and Comparative Examples, the measurements were performed by the following methods.

1. Number average molecular weight (hereinafter referred to simply as "$\overline{Mn}$") and weight average molecular weight (hereinafter referred to simply as "$\overline{Mw}$"):

The molecular weights were measured by gel permeation chromatography (GPC), utilizing a calibration curve obtained with respect to standard polystyrene samples.

2. Evaluation of the stability of the Izod impact strength and the occurrence of the silver streaks:

After continuously molding the polycarbonate using a injection machine (manufactured and sold by Japan Steel Works, Ltd., Japan, J100E) at 250° C., the molding operation was temporarily stopped. The polycarbonate under molding was allowed to reside for 20 minutes at 250° C., and then, the molding operation was resumed. Before and after the residence, specimens having a thickness of 3.2 mm were prepared by molding. The stability of the Izod impact strength and the occurrence of the silver streaks were evaluated in accordance with the following methods.

(1) The stability of the Izod impact strength of the specimen was evaluated on the basis of the ratio (%) (retention ratio) of the Izod impact strength after the residence relative to that before the residence, namely:

[(Izod impact strength of the specimen after the residence/Izod impact strength of the specimen before the residence)×100] (%).

The Izod impact strength was measured in accordance with ASTM-D256.

(2) The occurrence of the silver streaks of the specimen was evaluated by macrography. The evaluation standards are as follows.

◯: The silver streaks were not observed.

×: The silver streaks were observed.

3. Evaluation of the ash content:

A platinum crucible was washed with a detergent and then washed with purified water. After the washing, the crucible was dried in a drier and then allowed to cool in a desicator. The weight of the crucible was accurately measured on the other hand, a sample of the polycarbonate was accurately weighed and placed in the crucible. The sample in the crucible was combusted in a electric furnace at 600° C. while blowing air. After that, the crucible containing the combusted sample was placed in the desicator and allowed to cool there. The weight of the cooled crucible containing the combusted sample was measured accurately. The ash content was determined according to the following formula:

The ash content (% by weight)=[(weight (g) of the crucible containing the combusted sample−weight (g) of the crucible)/weight (g) of the sample]×100.

4. Color (yellowness index):

The yellowness index (YI) of the aromatic polycarbonate produced was evaluated, using a specimen which was obtained by injection molding the aromatic polycarbonate so as to have a thickness of 3.2 mm, in accordance with ASTM D 1925 by means of SM color computer Model SM-5 (manufactured and sold by Suga Test Instruments Co., Ltd., Japan). The evaluation was conducted at a central portion of the specimen. The higher YI value means the higher degree of discoloration.

EXAMPLE 1

Figure 8:
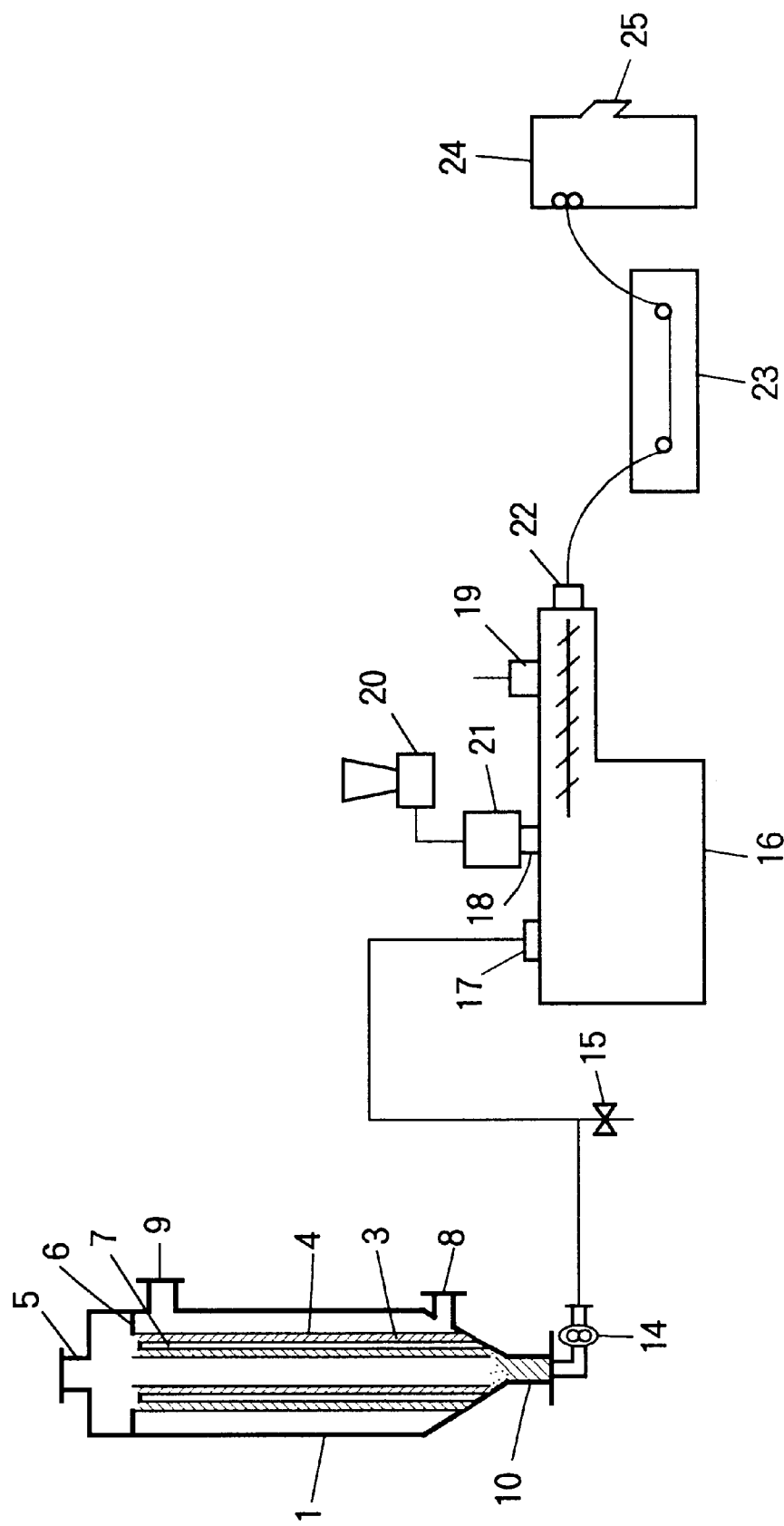
FIG. 8 is a diagram showing one mode of the method for producing the aromatic polycarbonate composition of the present invention.

An aromatic polycarbonate (PC)/ABS resin composition was produced by using a production system as shown in FIG. 8.

Polymerizer 1 has an internal volume of 0.57 m³, and is equipped with five plate-shaped guides 7 made of stainless steel SUS316L, each having a thickness of 1 mm, a width of 0.1 m and a length of 7.5 m. Polymerizer 1 is also equipped with distributing plate 6, through which polymerizable material 3 fed to polymerizer 1 can be distributed to plate-shaped guides 7 so that the distributed polymerizable material 3 can be caused to uniformly fall along and in contact with the surfaces of both opposite sides of each of plate-shaped guides 7. Further, polymerizer 1 has an external jacket (not shown), and the inside of polymerizer 1 is heated by passing a heating medium through the jacket. Polymerizer 1 has no agitating means for the prepolymer.

Polymerizable material 3 having an $\overline{M}n$ of 7,000, which had been prepared by reacting bisphenol A with diphenyl carbonate in a molar ratio of 1:1.05, was continuously fed to polymerizer 1 through inlet 5 for a polymerizable material at a flow rate of 50 kg/hr, so that a polymerization reaction of polymerizable material 3 was carried out under polymerization reaction conditions wherein the reaction temperature was 260° C., and the reaction pressure was 53 Pa (0.4 mmHg), while continuously withdrawing a produced aromatic polycarbonate from outlet 10. Then the aromatic polycarbonate was fed to extruder 16 through first inlet 17 under a pressure of 30 kg/cm². The aromatic polycarbonate reached a steady state about 500 hours after the start of the operation of the production system. Each of the aromatic polycarbonate products obtained from nozzle 15 for withdrawal of a produced polymer at points in time of 25 hours, 50 hours and 500 hours after the start of the operation had an $\overline{M}n$ of 11,200. The aromatic polycarbonate products obtained 500 hours after the start of the operation had an $\overline{M}w$ of 25,200.

The liquid volume V (m³) of polymerizable material 3 contained in polymerizer 1 at a point in time of 25 hours after the start of the polymerization reaction was determined according to the following formula:

$$V=[(w_1-w_2-w_3)/\rho]-v_0$$

wherein:

$w_1$ represents the total amount (kg) of polymerizable material 3 fed to polymerizer 1 during the 25-hour polymerization reaction;

$w_2$ represents the total amount (kg) of an aromatic polycarbonate withdrawn from polymerizer 1 during the 25-hour polymerization reaction;

$w_3$ represents the total amount (kg) of phenol and the like evaporated from polymerizer 1 during the 25-hour polymerization reaction;

$v_0$ represents the volume (m³) of polymerizable material 3 in pipes as determined in terms of the total inner volume of the pipes; and $\rho$ represents the specific gravity (kg/m³) of polymerizable material 3.

In the above formula, $w_1$ was 1,250 kg, $w_2$ was 1,064 kg, $w_3$ was 10 kg, $v_0$ was 0.01 m³ and $\rho$ was 1,100 kg/m³. Therefore, the liquid volume V of polymerizable material 3 in polymerizer 1 at a point in time of 25 hours after the start of the reaction was determined to be 0.15 m³. Also, the liquid volume of the prepolymer in the bottom portion of polymerizer 1 at a point in time of 25 hours after the start of the reaction was determined to be 0.002 m³.

The total evaporation surface area of the flowing liquid surfaces of the liquid mass of polymerizable material 3 falling along and in contact with plate-shaped guides 7 at a point in time of 25 hours from the start of the reaction was determined according to the following formula:

Total evaporation surface area of the flowing liquid surfaces on plate-shaped guides 7=(width of each plate-shaped guide 7)×(length of each plate-shaped guide 7)×(number of plate-shaped guides 7)×2=7.5 (m²)

The evaporation surface area of the horizontal surface of the liquid mass of polymerizable material 3 in the bottom portion of polymerizer 1 determined at a point in time of 25 hours after the start of the reaction was 0.008 m². From the above, it was found that the total evaporation surface area of the prepolymer at a point in time of 25 hours after the start of the reaction was about 7.5 m². The amount of the prepolymer, which was fed to polymerizer 1 during the polymerization reaction between the points in time of 25 hours and 50 hours after the start of the reaction, was equal to the total amount of the aromatic polycarbonate product withdrawn from polymerizer 1 and the phenol and the like evaporated from polymerizer 1 during the polymerization reaction between the points in time of 25 hours and 50 hours after the start of the reaction. Also, the liquid volume V and the total evaporation surface area S determined 50 hours after the start of the reaction were equal to those determined 25 hours after the start of the reaction.

From the above data, with respect to each of the prepolymers determined 25 hours and 50 hours after the start of the reaction, the values of the left side and right side of the above-mentioned formula (1) were calculated and found to be 1.70 and 1.00, respectively. The liquid volume V of the prepolymer was 26% of the internal volume of polymerizer 1. The rate Q at which the aromatic polycarbonate was produced was 49.6 kg/hr.

As thermoplastic resin (B), use was made of an ABS resin which had been produced by melt-kneading 50 parts by weight of a rubber graft copolymer (rubber content was 39% by weight; acrylonitrile monomer unit ratio was 25% by weight; ash content was 0.08% by weight; and graft ratio was 50% by weight) (obtained by polymerization of butadiene rubber/styrene/acrylonitrile) and 50 parts by weight of a vinyl polymer (acrylonitrile monomer unit ratio was 25% by weight) (obtained by polymerization of acrylonitrile/styrene). 100 Parts by weight of thermoplastic resin (B) and a mixed thermal stabilizer {0.001 part by weight of bis (nonylphenyl) hydrogenphosphite, 0.02 part by weight of tris(2,4-di-t-butylphenyl) phosphite and 0.2 part by weight of octadecyl-3-(3,5-di-t-butyl-4-hydroxyphenyl) propionate} were mixed by means of a Henschel mixer, and introduced to a gravimetric feeder 20 and then fed to extruder 16 through side feeder 21 and second inlet 18 at a flow rate of 50 kg/hr. Extruder 16 was operated under conditions wherein the barrel temperature was 250° C. and the number of revolutions was 200 rpm and wherein the aromatic polycarbonate composition was deaerated through vent 19 at a degree of vacuum of 100 mmHg.

The aromatic polycarbonate composition was extruded through die 22 in the form of strands, and introduced to a strand cutter 24' through a cooling bath 23, to thereby obtain pellets continuously. Then the obtained pellets were withdrawn from outlet 25 for pellets obtained by cutting strands. The properties of the composition obtained in the form of pellets were evaluated, and the results are shown in table 1. The composition obtained in pellet form contained no thermal decomposition products.

EXAMPLE 2

The production operation was carried out in substantially the same manner as in Example 1, except that, as thermoplastic resin (B), a mixture of a rubber graft copolymer and a vinyl polymer was used as such, without being subjected to melt-kneading in advance. Results are shown in table 1.

EXAMPLE 3

The production operation was carried out in substantially the same manner as in Example 1, except that an ABS resin consisting of a rubber graft copolymer (butadiene content was 15% by weight; acrylonitrile monomer unit ratio was 30% by weight; graft ratio was 50% by weight; and ash content was 0.08% by weight ) was employed. Results are shown in table 1.

COMPARATIVE EXAMPLE 1

An aromatic polycarbonate was obtained in substantially the same manner as in Example 1, except that a horizontal agitation type polymerizer vessel having twin-screw agitating blades (internal volume: 600 liters; length: 3 m; and diameter of the rotation of each agitating blade: 250 mm) was employed and the polymerization reaction was conducted under conditions wherein the reaction temperature was 300° C., the reaction pressure was 0.1 mmHg, and the revolution rate of each screw was 15 rpm. After the reaction system reached a stationary state, the aromatic polycarbonate had an $\overline{M}w$ of 25,800 and the aromatic polycarbonate discolored a little yellow as compared to the composition which was obtained in Example 1. Results are shown in table 1. Brown spots appeared on one of the moldings. Further, the total evaporation surface area S was 1.4 m², the liquid volume V was 0.24 m³ and the values of the left side and right side of the formula (1) were calculated and found to be 0.76 and 1.0, respectively.

COMPARATIVE EXAMPLE 2

50 parts by weight of a commercially available aromatic polycarbonate (Novarex 7025A; $\overline{M}w$: 26,000; manufactured and sold by Mitsubishi Chemical Industries, Ltd., Japan) and 50 parts by weight of the same ABS resin as employed in Example 1 were mixed. The resultant was extruded from an extruder (a twin-screw extruder with the two screws rotating in the same direction: 45 mm φ; L/D=30) at a temperature of 280° C. and a revolution rate of each screw of 200 rpm, to thereby obtain pellets. Results are shown in table 1.

EXAMPLE 4

The production operation was carried out in substantially the same manner as in Example 1, except that 0.002 part by weight of bis(n-phenyl) hydrogenphosphite was employed as a thermal stabilizer. Results are shown in table 1.

EXAMPLE 5

The production operation was carried out in substantially the same manner as in Example 1, except that 0.002 part by weight of tris(n-phenyl) hydrogenphosphite was employed as a thermal stabilizer. Results are shown in table 1.

EXAMPLE 6

Figure 9:
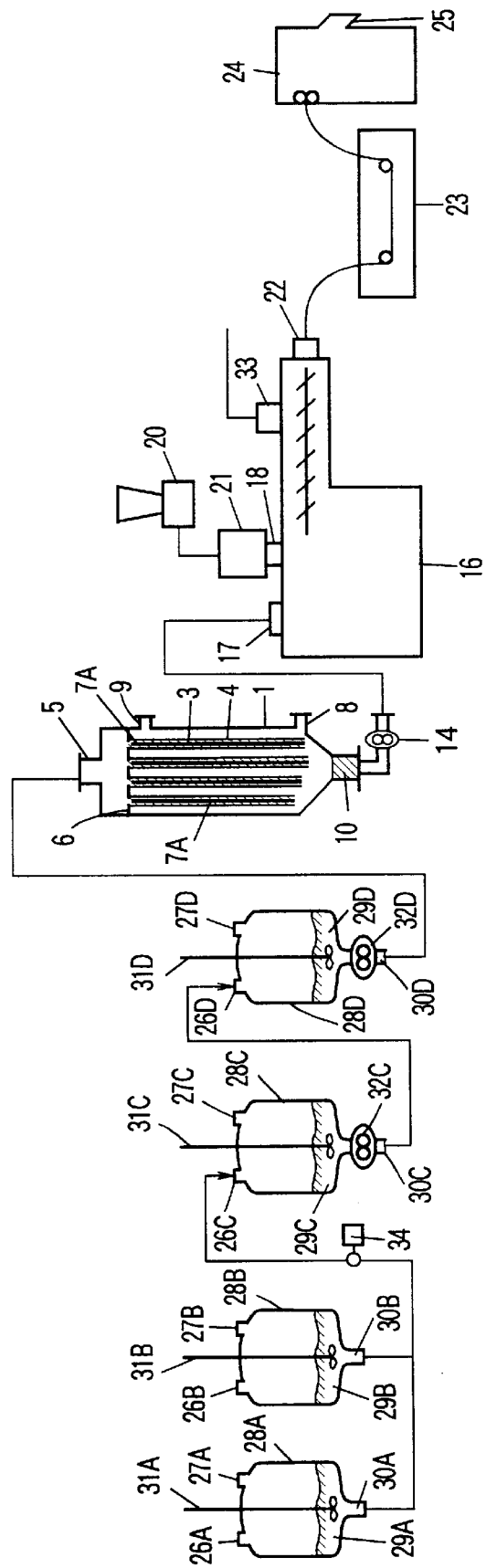
FIG. 9 is a diagram showing another mode of the method for producing the aromatic polycarbonate composition of the present invention.

An aromatic polycarbonate composition was produced by using a production system as shown in FIG. 9. The system of FIG. 9 comprises a polymerization step and a melt-kneading step.

The polymerization step was conducted by using an apparatus mentioned below.

A polymerization reaction in each of polymerizer vessels 28A and 28B (each having a capacity of 100 liters and equipped with an agitator having agitating blades of anchor type) was batchwise conducted, whereas the polymerization reaction in each of polymerizer vessels 28C and 28D (each having a capacity of 50 liters and equipped with an agitator having agitating blades of anchor type) and a cylindrical polymerizer 1 was continuously conducted.

The polymerizer 1 is a wire-wetting fall polymerizer as shown in FIG. 4(*a*). Polymerizer 1 is equipped with five column-shaped guides 7A made of stainless steel SUS316L, each having a diameter of 1 mm and a length of 8 m. Polymerizer 1 is also equipped with distributing plate 6, through which prepolymer 29 fed to polymerizer 1 can be uniformly distributed to each of guides 7A. Further, polymerizer 1 has an external jacket (not shown), and the inside of polymerizer 1 is heated by passing a heating medium through the jacket. Polymerizer 1 has no agitating means for the prepolymer.

The polymerization reaction conditions in both of first agitation type polymerizer vessels 28A and 28B were as follows: the reaction temperature was 180° C., the reaction pressure was atmospheric pressure, and the flow rate of nitrogen gas was 1 liter/hr.

In operation, 80 kg of polymerizable materials [i.e., bisphenol A as an aromatic dihydroxy compound and diphenyl carbonate as a diaryl carbonate (the molar ratio of diphenyl carbonate to bisphenol A: 1.10)] were charged into polymerizer vessel 28A. The monomer mixture in polymerizer 28A was polymerized in a molten state for 4 hours while agitating, to obtain prepolymer 29A. Outlet 30A was opened, and prepolymer 29A was fed to second agitation type polymerizer vessel 28C (having a capacity of 50 liters) at a flow rate of 10 liter/hr.

While feeding prepolymer 29A obtained in first agitation type polymerizer vessel 28A to second agitation type polymerizer vessel 28C, first agitation type polymerizer vessel 28B was operated to polymerize the monomer mixture of bisphenol A and diphenyl carbonate in the same manner as in the agitation polymerization in first agitation type polymerizer vessel 28A, to obtain prepolymer 29B.

When first agitation type polymerizer vessel 28A became empty, outlet 30A of polymerizer 28A was closed and, instead, outlet 30B of polymerizer 28B was opened, so that prepolymer 29B was fed from first agitation type polymerizer vessel 28B to second agitation type polymerizer vessel 28C at a flow rate of 10 liter/hr. In this instance, the same polymerizable materials as mentioned above were charged into polymerizer 28A. While feeding prepolymer 29B obtained in first agitation type polymerizer vessel 28B to second agitation type polymerizer vessel 28C, polymerizer vessel 28A was operated, so that the monomer mixture charged therein was polymerized in the same manner as mentioned above.

With respect to a batchwise polymerization in first agitation type polymerizer vessels 28A and 28B and the alternate feedings of prepolymers 29A and 29B from polymerizers 28A and 29B to second agitation type polymerizer vessel 28C, the same operation as mentioned above was repeated, so that the prepolymer (either prepolymer 29A or prepolymer 29B, alternately) was continuously fed to second agitation type polymerizer vessel 28C.

In second agitation type polymerizer vessel 28C, a further agitation polymerization of prepolymers 29A and 29B, alternately fed from first agitation type polymerizer vessels 28A and 28B, was continuously carried out under polymerization reaction conditions wherein the reaction temperature was 240° C., the reaction pressure was 80 mmHg and the flow rate of nitrogen gas was 2 liters/hr, thereby obtaining prepolymer 29C.

When the volume of prepolymer 29C in second agitation type polymerizer vessel 28C reached 20 liters, it was started to feed prepolymer 29C continuously to third agitation type polymerizer vessel 28D. The feeding rate of prepolymer 29C to third agitation type polymerizer vessel 28D was controlled so that the volume of prepolymer 29C in second agitation type polymerizer vessel 28C was constantly maintained at 20 liters.

In third agitation type polymerizer vessel 28D, a further agitation polymerization of prepolymer 29C fed from second agitation type polymerizer vessel 28C was continuously carried out under polymerization reaction conditions wherein the reaction temperature was 250° C., the reaction pressure was 2.0 mmHg and the flow rate of nitrogen gas was 2 liters/hr, thereby obtaining prepolymer 29D.

When the volume of prepolymer 29D in third agitation type polymerizer vessel 28D reached 20 liters, it was started to feed prepolymer 29D continuously to first wire-wetting fall polymerizer 1. The feeding rate of prepolymer 29D to first wire-wetting fall polymerizer 1 was controlled so that the volume of prepolymer 29D in third agitation type polymerizer vessel 28D was constantly maintained at 20 liters. The feeding of prepolymer 29D to first wire-wetting fall polymerizer 1 was conducted through inlet 5.

In first wire-wetting fall polymerizer 1, a wire-wetting fall polymerization was continuously carried out under polymerization reaction conditions wherein the reaction temperature was 255° C., the reaction pressure was 1.0 mmHg and the flow rate of nitrogen gas was 1 liter/hr, while continuously withdrawing a produced aromatic polycarbonate from outlet 10. Then, the aromatic polycarbonate was fed to extruder 16 through first inlet 17. The aromatic polycarbonate obtained from outlet 10 had an $\overline{M}w$ of 23,500 and an $\overline{M}n$ of 9,000.

The liquid volume V and the evaporation surface area S of prepolymer 3 contained in polymerizer 1 at a point in time of 25 hours after the start of the polymerization reaction were determined in the same manner as in Example 1. The liquid volume V and the total evaporation surface area S of prepolymer 3 contained in polymerizer 1 at a point in time of 25 hours after the start of the polymerization reaction were determined and found to be 0.012 $m^3$ and 2.2 $m^2$, respectively. Also, the liquid volume V and the total evaporation surface area S determined 50 hours after the start of the reaction were equal to those determined 25 hours after the start of the reaction.

From the above data, with respect to the prepolymer obtained 25 hours after the start of the reaction, the values of the left side and right side of the above-mentioned formula (I) were calculated and found to be 2.26 and 0.98, respectively.

The melt kneading operation using extruder 16 was carried out as follows.

Extruder 16 was a co-rotating twin-screw extruder (diameter of each of the screws: 30 mm; L/D ratio: 30) having first inlet 17, second inlet 18, and inlet 33 for a liquid. Extruder 16 was operated under conditions wherein the kneading temperature was 240° C. and the number of revolutions was 200 rpm. Second inlet 18 was provided on a side wall of extruder 16.

As thermoplastic resin (B), use was made of a mixture of 50 parts by weight of a rubber graft copolymer (rubber content was 39% by weight; acrylonitrile monomer unit ratio was 25% by weight; ash content was 0.08% by weight; and graft ratio was 50% by weight) (obtained by polymerization of butadiene rubber/styrene/acrylonitrile) and 50 parts by weight of a vinyl polymer (acrylonitrile monomer unit ratio was 40% by weight) (obtained by polymerization of acrylonitrile/styrene)}. 100 parts by weight of thermoplastic resin (B), a mixed thermal stabilizer {0.005 part by weight of bis(nonylphenyl) hydrogenphosphite, 0.01 part by weight of tris(2,4-di-t-butylphenyl) phosphite, 0.1 part by weight of octadecyl-3-(3,5-di-t-butyl-4-hydroxyphenyl)

propionate} and 0.3 part by weight of polytetrafluoroethylene (F-201L: manufactured and sold by Daikin Industries, Ltd., Japan) were homogeneously mixed by means of a Henschel mixer, and introduced to gravimetric feeder 20 and then fed to extruder 16 through side feeder 21 and second inlet 18. As a phosphorus-containing flame retardant, an oligomeric phosphate-containing flame retardant represented by formula (XXIV) above [the average value of m in the formula (XXIV) was 1.15] was fed to extruder 16 through inlet 33 for a liquid. The respective feeding rates of the materials were controlled so that the feeding ratio of the materials became as follows: the material fed through inlet 17: 80 parts by weight; the material fed through second inlet. 18: 20 parts by weight; and the material fed through inlet 33 for a liquid: 10 parts by weight.

The aromatic polycarbonate composition was extruded through die 22 in the form of strands, and introduced to a strand cutter 24 through a cooling bath 23, to thereby obtain pellets continuously. Then the obtained pellets were withdrawn from outlet 25 for pellets obtained by cutting strands. The properties of the composition obtained in the form of pellets were evaluated, and the results are shown in table 1. The composition obtained in pellet form contained no thermal decomposition products.

TABLE 1

| | Color (YI) | Occurrence of the silver streaks | Retention ratio (%) of Izod impact strength |
|---|---|---|---|
| Example 1 | 5.8 | ○ | 98 |
| Example 2 | 5.3 | ○ | 100 |
| Example 3 | 6.1 | ○ | 85 |
| Comparative Example 1 | 12.5 | x | 38 |
| Comparative Example 2 | 10.7 | x | 52 |
| Example 4 | 5.5 | ○ | 96 |
| Example 5 | 5.9 | ○ | 82 |
| Example 6 | 6.2 | ○ | 93 |

INDUSTRIAL APPLICABILITY

The aromatic polycarbonate composition of the present invention can be produced in high efficiency by virtue of the advantages of the process employed for producing aromatic polycarbonate (A) used in the composition. The advantages are noted in that a large agitation force is not needed and that the volumetric efficiency of the polymerizer is high, differing from the conventional process for producing an aromatic polycarbonate. In addition, the aromatic polycarbonate composition of the present invention is advantageous not only in that it has excellent color and contains no impurity or heat decomposition product, but also in that it is free from the occurrence of disadvantageous phenomena during the molding thereof, such as occurrence of silver streaks and a lowering of the Izod impact strength. Therefore, the aromatic polycarbonate composition of the present invention can be advantageously used as a material for producing polycarbonate alloy products in a wide variety of fields, such as fields of domestic electric appliances and automobiles.

What is claimed is:

1. An aromatic polycarbonate composition which is substantially the same as that produced by a method comprising:

(1) subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein said polymerizable material is present in the form of a liquid mass in the polymerizer and wherein said liquid mass of polymerizable material being transesterified in said polymerizer has an exposed surface, said transesterification reaction of said liquid mass of polymerizable material being performed under conditions such that the following formula (1) is satisfied:

$$\log (S/V) \geq 2 \times 10^{-5} \times \bar{M}n + 0.8 \quad (1)$$

wherein:

S represents an evaporation surface area (m$^2$) which is defined as the area (m$^2$) of said exposed surface of the liquid mass of polymerizable material;

V represents the volume (m$^3$) of said liquid mass of polymerizable material in said polymerizer; and $\bar{M}n$ represents the number average molecular weight of the aromatic polycarbonate to be produced, thereby obtaining an aromatic polycarbonate (A) in molten form;

(2) adding to the obtained aromatic polycarbonate (A) in molten form a thermoplastic resin (B) other than an aromatic polycarbonate; and (3) kneading said aromatic polycarbonate (A) and said thermoplastic resin (B) together.

2. The aromatic polycarbonate composition according to claim 1, wherein the addition of said thermoplastic resin (B) to said aromatic polycarbonate (A) in step (2) and the kneading thereof in step (3) are conducted using an extruder having a first inlet and a second inlet, said second inlet being disposed downstream of said first inlet as viewed in an extrusion direction of said extruder, and wherein said aromatic polycarbonate (A) and said thermoplastic resin (B) are fed to said extruder through said first inlet and said second inlet, respectively, and kneaded together in said extruder.

3. The aromatic polycarbonate composition according to claim 1 or 2, wherein said thermoplastic resin (B) is a rubber-reinforced thermoplastic resin which comprises 10 to 100 parts by weight of a rubber graft copolymer obtained by a method comprising grafting on a rubber polymer at least one vinyl compound graft-copolymerizable with said rubber polymer, and 90 to 0 parts by weight of at least one vinyl polymer, and wherein the total amount of said rubber graft copolymer and said at least one vinyl polymer is 100 parts by weight.

4. The aromatic polycarbonate composition according to claim 3, wherein said rubber-reinforced thermoplastic resin is an ABS resin.

5. The aromatic polycarbonate composition according to claim 1 or 2, wherein said molten aromatic polycarbonate (A) and said thermoplastic resin (B) are kneaded together with a thermal stabilizer.

6. The aromatic polycarbonate composition according to claim 1 or 2, wherein said molten aromatic polycarbonate (A) and said thermoplastic resin (B) are kneaded together with a thermal stabilizer and a phosphorus-containing flame retardant.

7. The aromatic polycarbonate composition according to claim 2, wherein the feeding of said molten aromatic polycarbonate (A) to said extruder through said first inlet is conducted under pressure.

8. The aromatic polycarbonate composition according to claim 2, wherein said thermoplastic resin (B) fed to said extruder through said second inlet is in non-molten form.

9. The aromatic polycarbonate composition according to claim 3, wherein said thermoplastic resin (B) fed to said extruder through said second inlet is in non-molten form and wherein the kneading is conducted at a temperature of 280° C. or less.

10. The aromatic polycarbonate composition according to claim 3, wherein said thermoplastic resin (B) has an ash content of 0.1% by weight.

11. The method according to claim 1, wherein said transesterification reaction is performed in a wetting fall mode in which said liquid mass of polymerizable material is allowed to fall along and in contact with a part or entire of a surface of a solid object selected from the group consisting of an inner wall of said polymerizer and at least one guide provided in said polymerizer so that polymerization of said polymerizable material is effected during the fall thereof.

12. The method according to claim 1, wherein said volume V ($m^3$) of said liquid mass of polymerizable material is 5%, based on the internal volume of said polymerizer.

13. The method according to claim 1, wherein said evaporation surface area S ($m^2$) of said liquid mass of polymerizable material satisfies the following formula (2):

$$S \geq 0.03\, Q \tag{2}$$

wherein Q represents a rate (kg/hr) at which aromatic polycarbonate (A) is produced.

14. The method according to claim 1, wherein said rate Q is 1 kg/hr or more.

* * * * *